United States Patent
Rao et al.

(10) Patent No.: US 10,827,380 B2
(45) Date of Patent: Nov. 3, 2020

(54) SYSTEM AND METHOD FOR SUPPORTING URLLC IN ADVANCED V2X COMMUNICATIONS

(71) Applicants: Jaya Rao, Ottawa (CA); Sophie Vrzic, Kanata (CA)

(72) Inventors: Jaya Rao, Ottawa (CA); Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/258,226

(22) Filed: Jan. 25, 2019

(65) Prior Publication Data

US 2019/0239112 A1    Aug. 1, 2019

Related U.S. Application Data

(60) Provisional application No. 62/623,640, filed on Jan. 30, 2018.

(51) Int. Cl.

| | |
|---|---|
| *H04W 28/02* | (2009.01) |
| *H04W 28/06* | (2009.01) |
| *H04W 4/40* | (2018.01) |
| *H04W 76/14* | (2018.01) |
| *H04W 4/70* | (2018.01) |
| *H04W 76/27* | (2018.01) |

(Continued)

(52) U.S. Cl.
CPC ......... *H04W 28/0268* (2013.01); *H04W 4/40* (2018.02); *H04W 4/70* (2018.02); *H04W 28/06* (2013.01); *H04W 76/14* (2018.02); *H04L 67/12* (2013.01); *H04W 4/06* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2014/0023008 A1* | 1/2014 | Ahn | H04L 5/006 370/329 |
| 2016/0044552 A1 | 2/2016 | Heo et al. | |
| 2016/0242221 A1* | 8/2016 | Jung | H04W 8/005 |

(Continued)

OTHER PUBLICATIONS

Qualcomm Incorporated,"Carrier Aggregation for V2X Phase 2",3GPP TSG RAN WG1 Meeting #91 R1-1720408, Reno, USA, Nov. 27-Dec. 1, 2017,total 7 pages.

(Continued)

*Primary Examiner* — Rebecca E Song

(57) ABSTRACT

A Method at a transmitting Vehicle User Equipment (Tx V-UE). The method comprises: transmitting, to a Radio Access Network (RAN) a set of parameters comprising any one or more of: a capability of the Tx V-UE, V2X service information and channel information; receiving, from the RAN, any one or more of: a Sidelink Radio Bearer (SL-RB) configuration; an activation status of a primary Sidelink (SL) channel; —a respective activation status of one or more secondary SL channels, and at least one grant for SL radio resources associated with each activated SL channel; and transmitting, to a Receiving Vehicle User Equipment (Rx V-UE), duplicated packets using SL radio resources of the primary SL channel and the one or more secondary SL channels.

20 Claims, 15 Drawing Sheets

(51) Int. Cl.
  *H04W 4/06* (2009.01)
  *H04L 29/08* (2006.01)

(56) References Cited

U.S. PATENT DOCUMENTS

2017/0331577 A1    11/2017  Parkvall et al.
2018/0368191 A1*   12/2018  Vutukuri ............... H04W 76/14
2019/0215685 A1*    7/2019  Wang .................... H04W 4/40
2019/0335532 A1*   10/2019  Kim ..................... H04W 4/40
2019/0357025 A1*   11/2019  Hwang .................. H04L 5/001

OTHER PUBLICATIONS

Qualcomm Incorporated,"Uni-directional sidelink UE-to-NW relaying",3GPP TSG RAN WG1 Meeting #89 R1-1708815, Hangzhou, China, May 15-19, 2017,total 5 pages.

* cited by examiner

|  | CC1 | CC2 | CC3 | CC4 |
|---|---|---|---|---|
| SL-RB-1 (PPPP1)<br>T_sense = T1<br>Reliability = R1 | Primary CC<br>$CBR^{th} = 0.4$<br>$\Delta CBR^{th} = \Delta 0.2$ | $CBR^{th} = 0.5$<br>$\Delta CBR^{th} = \Delta 0.2$ | $CBR^{th} = 0.6$<br>$\Delta CBR^{th} = \Delta 0.2$ | $CBR^{th} = 0.7$<br>$\Delta CBR^{th} = \Delta 0.2$ |
| SL-RB-2 (PPPP2)<br>T_sense = T2<br>Reliability = R2 | Not Configured | Primary CC<br>$CBR^{th} = 0.5$<br>$\Delta CBR^{th} = \Delta 0.1$ | $CBR^{th} = 0.6$<br>$\Delta CBR^{th} = \Delta 0.1$ | $CBR^{th} = 0.7$<br>$\Delta CBR^{th} = \Delta 0.1$ |
| SL-RB-3 (PPPP3)<br>T_sense = T3<br>Reliability = R3 | Not Configured | Not Configured | Primary CC<br>$CBR^{th} = 0.6$<br>$\Delta CBR^{th} = \Delta 0.1$ | $CBR^{th} = 0.7$<br>$\Delta CBR^{th} = \Delta 0.1$ |
| SL-RB-3 (PPPP3)<br>T_sense = T3<br>Reliability = R3 | Not Configured | Not Configured | Not Configured | Primary CC<br>$CBR^{th} = 0.7$<br>$\Delta CBR^{th} = \Delta 0.1$ |

FIG. 6

SYSTEM AND METHOD FOR SUPPORTING URLLC IN ADVANCED V2X COMMUNICATIONS

CROSS-REFERENCE TO RELATED APPLICATIONS

This application claims the benefit of U.S. Provisional Application Ser. No. 62/623,640 titled "SYSTEM AND METHOD FOR SUPPORTING URLLC IN ADVANCED V2X COMMUNICATIONS" filed on Jan. 30, 2018, which is incorporated by reference herein in its entirety.

FIELD OF THE INVENTION

The present invention pertains to the field of New Radio (NR) sidelink communications such as V2X communications, and in particular to Systems and Methods for supporting Ultra Reliable Low Latency Communications (URLLC) in advanced NR V2X communications.

BACKGROUND

V2X communications typically include transmissions between Vehicle User Equipment (V-UE) and a network (using the Uu interface, for example), and V-UE to V-UE (using the PC5 interface, for example). Existing V2X communications in Long Term Evolution (LTE) and Dedicated Short-Range Communications (DSRC) are designed to satisfy the basic safety related requirements for use cases such as Emergency Vehicle Warning, Intersection Collision Warning, Slow Vehicle Indication and Collision Risk Warning. The latency and reliability requirements of these use cases are typically 10 ms to 100 ms and $10^{-3}$, respectively.

For advanced New Radio (NR) V2X use cases considered for 5G, such as remote driving, advanced driving (e.g. emergency alignment between nearby vehicles), extended sensors (for example, to support automated driving) and platooning, it is necessary to support more stringent Ultra-Reliable Low Latency Communications (URLLC) requirements which include a maximum latency of 3 ms to 5 ms (between the transmitting V2X application and the receiving V2X application) and a reliability requirement of $10^{-5}$.

Satisfying the URLLC requirements in NR V2X usage scenarios in urban high density conditions and high speed freeway conditions is generally more challenging than non-vehicle borne usage cases due to:
  Unavailability of network coverage at all locations, which can impede the ability for network access nodes to allocate radio resources to V-UEs. Even in scenarios with network coverage, the existing resource scheduling procedure (based on transmission of scheduling request (SR), buffer status report (BSR) and SL Grants) results in high latency, which precludes URLLC.
  Presence of V-UEs operating in different states, including RRC Connected, RRC Inactive and RRC Idle. This can result in an inconsistent operation among the V-UEs operating within a given area.
  Presence of UEs (e.g. pedestrian UE (P-UEs)) using the PC5 interface with a limited number of Rx chains for receiving data and sensing in multiple channels. In this case the Tx UEs have to select channels which are aligned with the channels selected by Rx UEs.
  Presence of UEs with different resource selection modes sharing a common set of radio resources. This may result in a coexistence problem where the resources for UEs operating in Mode 3 are scheduled by the network while the resources for UEs operating in Mode 4 are autonomously selected from a set of pre-configured resource pools.
  Possibility to coexist with other DSRC users of ITS spectrum (5.9 GHz) which access the shared resources using 802.11p MAC and PHY layer techniques, different from that of LTE.

The existing techniques used in V2X communications based on either LTE eV2X (Release 14 LTE) or 802.11p (DSRC) are unable to satisfy the URLLC requirements for NR V2X.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide techniques for supporting sidelink communications for 5G NR to satisfy quality of service (QoS) requirements over a sidelink.

Embodiments of the present disclosure is provide techniques for supporting Ultra Reliable Low Latency Communications (URLLC) in advanced V2X communications that overcome at least some of the above-noted limitations of the prior art.

Accordingly, an aspect of the present disclosure provides a method at a transmitting Vehicle User Equipment (Tx V-UE). The method comprises: transmitting, to a Radio Access Network (RAN) a set of parameters comprising any one or more of: a capability of the Tx V-UE, V2X service information and channel information; receiving, from the RAN, any one or more of: a Sidelink Radio Bearer (SL-RB) configuration; an activation status of a primary Sidelink (SL) channel; —a respective activation status of one or more secondary SL channels, and at least one grant for SL radio resources associated with each activated SL channel; and transmitting, to a Receiving Vehicle User Equipment (Rx V-UE), duplicated packets using SL radio resources of the primary SL channel and the one or more secondary SL channels.

Another aspect of the present disclosure provides a method at a transmitting Vehicle User Equipment (Tx V-UE). The method comprises: receiving, from a second Vehicle User Equipment (V-UE), an indication of CC usage of the second V-UE; selecting one or more CCs, based on the received indication of CC usage, the one or more CCs being selected to minimize at least interference with the second V-UE; and transmitting packets to a Receiving Vehicle User Equipment (Rx V-UE), using the selected one or more CCs.

Another aspect of the present disclosure provides a method at a transmitting Vehicle User Equipment (Tx V-UE). The method comprises: receiving, from a Radio Access Network (RAN), a Packet Duplication (PD) trigger; at least partially in response to the received PD trigger, activating packet duplication at a PDCP entity of the Tx V-UE; and transmitting duplicated packets to a Receiving Vehicle User Equipment (Rx V-UE), using at least two sidelink CCs.

Another aspect of the present disclosure provides a method at a transmitting Vehicle User Equipment (Tx V-UE). The method comprises: receiving, from a Receiving Vehicle User Equipment (Rx V-UE), a Packet Duplication (PD) trigger; and at least partially in response to the received PD trigger, transmitting duplicated packets to the Rx V-UE, using at least two sidelink CCs.

Another aspect of the present disclosure provides a method at a transmitting Vehicle User Equipment (Tx V-UE). The method comprises: transmitting, to a source Radio Access Network (RAN) access point, a set of parameters comprising any one or more of: a Channel Busy Ratio (CBR); and channel information of CCs pertaining to a coverage area of the source RAN access point; receiving, from the source RAN access point, CC information pertaining to a coverage area of a target RAN access point; and transmitting duplicated packets using SL radio resources of the CCs pertaining to the coverage area of the source RAN access point, and SL resources of the CCs pertaining to the coverage area of the target RAN access point.

Another aspect of the present disclosure provides a method at a transmitting Vehicle User Equipment (Tx V-UE). The method comprises: receiving, from a source Radio Access Network (RAN) access point, rules for selecting CCs in a coverage area of a target RAN access point; receiving, from a Receiving Vehicle User Equipment (Rx V-UE), a Packet Duplication (PD) trigger; and at least partially in response to the received PD trigger, transmitting duplicated packets using SL radio resources of CCs pertaining to a coverage area of the source RAN access point, and SL resources of new CCs selected in accordance with the received rules.

BRIEF DESCRIPTION OF THE FIGURES

Further features and advantages of the present invention will become apparent from the following detailed description, taken in combination with the appended drawings, in which:

FIG. 6 is a table showing a representative Pro-se Per Packet Priority (PPPP)-to-CBRthreshold mapping for packet duplication;

It will be noted that throughout the appended drawings, like features are identified by like reference numerals.

DETAILED DESCRIPTION

In the following description, features of the present invention are described by way of example embodiments. For convenience of description, these embodiments make use of features and terminology known from communication system specifications, such as 4G and 5G networks, as defined by the Third Generation Partnership Project (3GPP). However, it shall be understood that the present invention is not limited to such networks.

Figure 1:
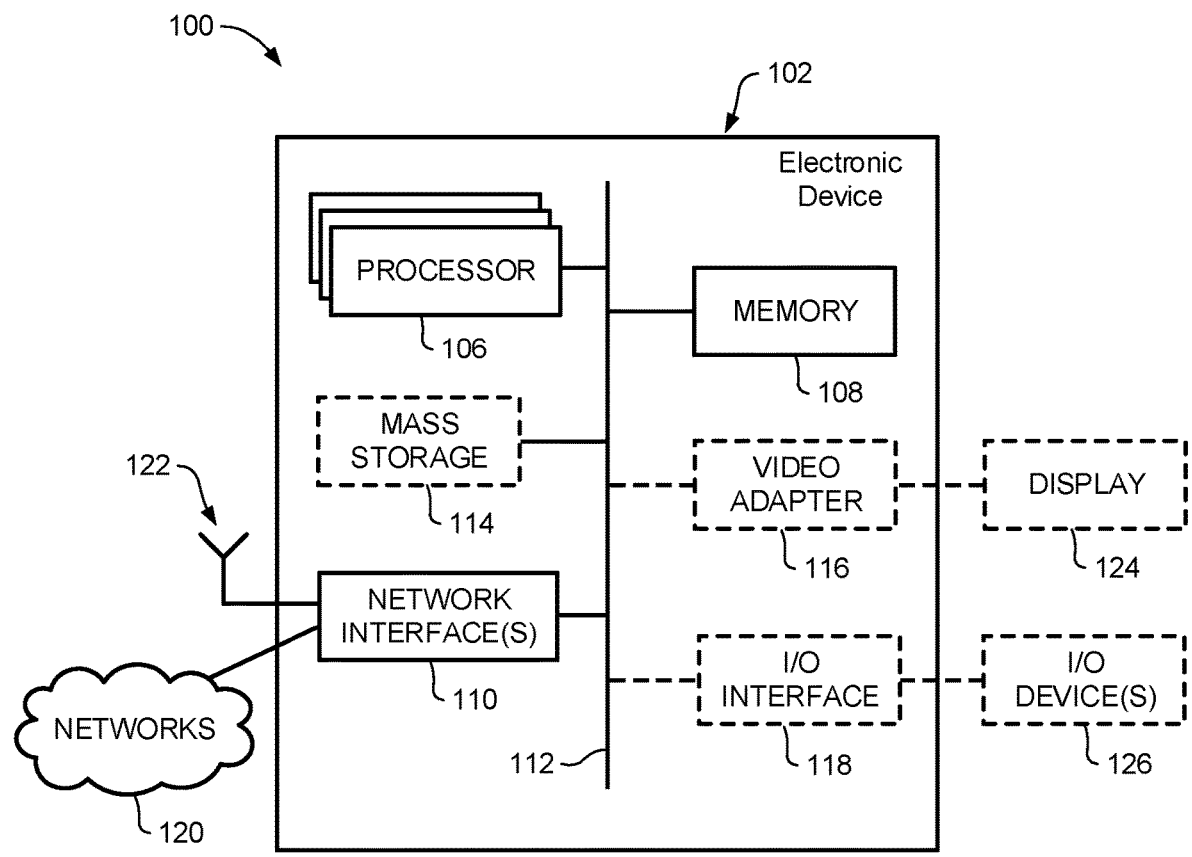
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB)), a home subscriber server (HSS), a gateway (GW) such as a packet gateway (PGW) or a serving gateway (SGW) a User Plane Function (UPF) or various other nodes or functions within an evolved packet core (EPC) network or a 5G Core (5GC) network. In other embodiments, the electronic device 102 may be a device that connects to network infrastructure over a radio interface, such as a mobile phone, smart phone, vehicle, road-side unit (RSU) or other such device that may be classified as a User Equipment (UE). In some embodiments, ED 102 may be a Machine Type Communications (MTC) device (also referred to as a machine-to-machine (m2m) communication device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
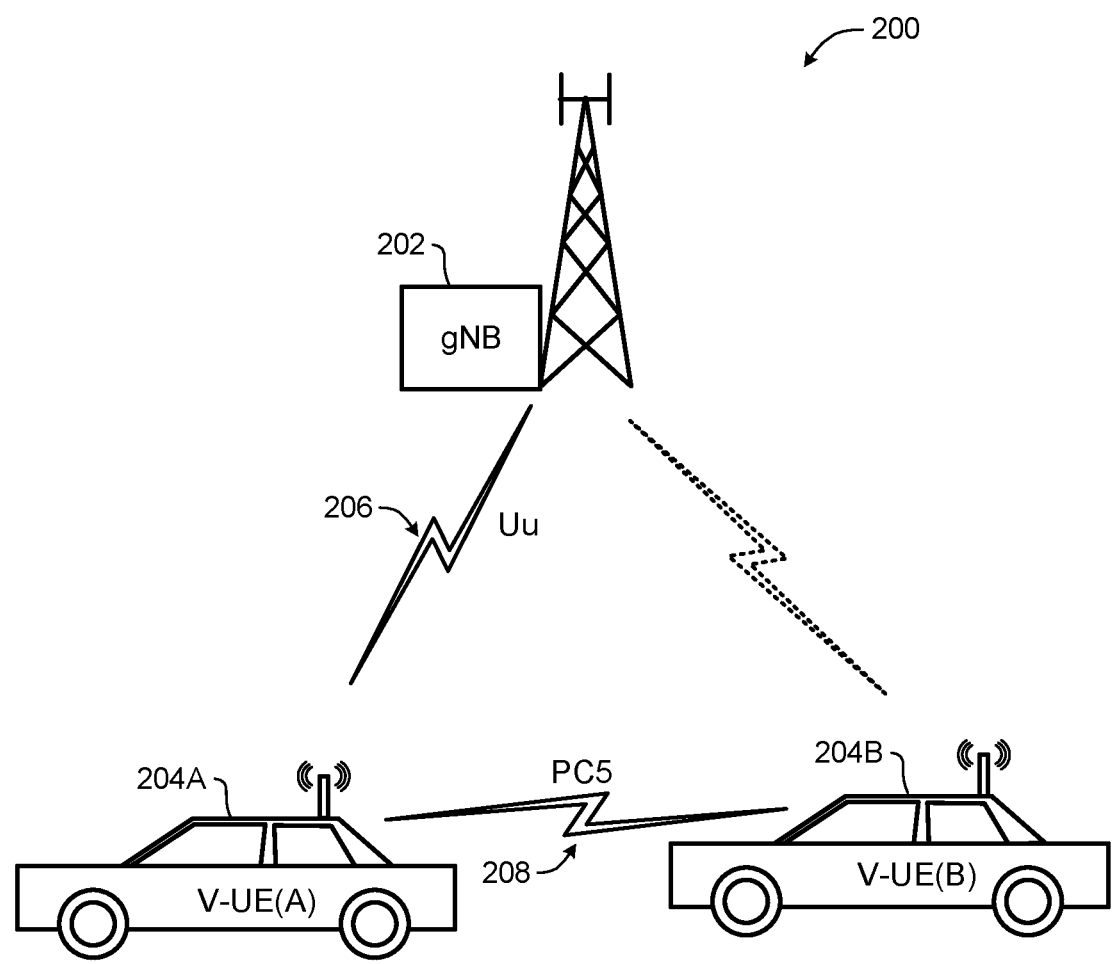
FIG. 2 is a block diagram showing elements of a (Radio) Access Network (R)AN usable in embodiments of the present invention.

FIG. 2 schematically illustrates connections in a (Radio) Access Network (R)AN 200 usable in embodiments of the present invention. As may be seen in FIG. 2, an Access Point 202 (which may, for example, be provided as a gNB and is referred to hereinafter as RAN node 202) may communicate with a pair of UEs 204A, 204B via respective radio links 206 (which may, for example, be provided as a Uu interface). In addition, the UEs 204A, 204B may communicate directly with each other via a sidelink (SL) 208 which may, for example, be provided as a PC5 interface.

In conventional systems, radio resource allocation and dynamic resource scheduling to support communications between a UE 204 and the RAN node 202 and UE-to-UE may be referred to as "Mode 3" operation of the UE. This may include signalling between the involved UEs 204 and the Access Point 202 for radio resource allocation and dynamic scheduling to facilitate direct UE-to-UE communications. Similarly, direct communication between a pair of UEs 204A and 204B over the sidelink 208 (and therefore bypassing the RAN node 202 for radio resource allocation and dynamic scheduling) may be referred to as "Mode 4" operation of each involved UE.

It will be appreciated that FIG. 2 presents a simplified view of the (R)AN 200. In some cases, the UEs 204A and 204B may communicate with respective different Access Points 202, which may be connected via a backhaul network (not shown) in a known manner. In some cases, point-to-point communications between a pair of UEs 204A and 204B as shown in FIG. 2 may occur over the sidelink 208. In other cases, broadcast or one-to-many communications between a transmitting UE (for example UE(A) 204A) and two or more receiving UEs may occur over the sidelink 208. Note point-to-point communications between a pair of UEs 204A and 204B broadcast or one-to-many communications between a transmitting UE (for example UE(A) 204A) and two or more receiving UEs may occur over the sidelink 208 are referred to as sidelink communications. Sidelink communications involving one-to-one communications between a transmitting UE and a receiving UEs may be referred to as unicast. Sidelink communications involving one-to-many communications between a transmitting UE and two or more receiving UEs within a group of UE may be referred to as groupcast or multicast. In the case of unicast, the receiving UE may be referred to as a destination UE and identified with a UE destination L2 ID. In the case of groupcast, the set of receiving UEs belonging to a group, for example, a vehicle platoon may be referred to as a destination group and identified with a destination Group L2 ID. It should be appreciated that the term sidelink communications includes sidelink transmissions.

Embodiments of the present invention define enhancements to conventional Mode 3 and Mode 4 operations to provide an "enhanced Mode 3" and an "enhanced Mode 4" which support URLLC requirements over the sidelink PC5 interface. The PC5 sidelink can be used for either unicast or broadcast transmissions. Alternatively, enhanced Mode 3 may be referred to as Mode 1 and enhanced Mode 4 may be referred to as Mode 2 within the context of 5G New Radio (NR) V2X communications. However, it should be appreciated that other modes can be utilized, or that the modes described herein can be referred to by other names.

Aspects of the present invention include:

A method of configuring and selecting resources over multiple Component Carriers (CCs) or resource pools in Mode 3 and Mode 4 to support Packet Duplication (PD). PD is applied at the radio bearer level for User Plane (UP) and Control Plane (CP) packets on multiple component carriers (CCs) assigned to the configured sidelink radio bearers (SL-RBs). This is based on limited or no sensing of the Channel Busy Ratio (CBR) of the CCs. The component carriers refer to the sidelink carriers (SC) where each sidelink carrier can consist of one or multiple radio resource pools (RP) used for sidelink communications.

A method to prevent packet collisions in Mode 3 and Mode 4 co-existence scenarios when using PD. This is based on CBR reporting and resource reservation indicators.

A method to dynamically activate/deactivate PD on the sidelink based on RRC signalling and MAC layer control signalling.

A method to support seamless handover (i.e. to achieve 0ms interruption time) when performing sidelink transmissions.

Embodiments of the present invention may provide one or more of the following benefits:

Enhances the existing V2X transmission techniques in Mode 3 and Mode 4 by incorporating solutions to satisfy the low latency and high reliability requirements;

Addresses issues related to sensing based semi-persistent scheduling (SPS) solution which is currently used for LTE Mode 4 transmissions. The issues addressed include high delay due to sensing and back-off when transmissions are performed over multiple carriers for PD.

Addresses resource over-provisioning issues and improves resource utilization when using SPS based SL grants for sidelink transmissions.

Addresses issues related to HARQ which results in high latency even when reliability requirements can be satisfied using existing retransmission techniques for sidelink transmissions.

Addresses high congestion and high collisions issues when using shared resource pools in coexistence scenarios (i.e. Mode 3 and Mode 4 UEs use common CCs) for performing PD.

It is contemplated that the methods of the present invention will be particularly useful in for sidelink communications between Vehicle-UE (V-UE) devices. Accordingly, the following discussion will focus on embodiments involving V-UE-to-V-UE sidelink communication scenarios. However, it will be appreciated that the methods of the present invention may be implemented in communication scenarios involving any combination of vehicle and non-vehicle UEs. Accordingly, in the discussion below, reference will be made to both V-UEs and UEs, it being understood that these (V-)UEs may be provided as either vehicle UEs or non-vehicle UEs, as desired.

Overview of Operation in Enhanced Mode 3 for 5G

Enhanced Mode 3 based V2X communications apply in i) in-coverage (both Tx and Rx UEs are in a coverage area of a particular RAN node (e.g., gNB), ii) partial coverage (Tx UE is in the coverage area of a particular RAN node (e.g., gNB) and the Rx UE is out of coverage) and iii) inter-node coverage (both Tx and Rx UEs are in the respective coverage areas of different RAN nodes (e.g., gNBs) scenarios. Also, Mode 3 applies in RRC Connected or RRC Inactive states where the UE related context related to security, configured SL-RBs, QoS requirements and upper layer information (e.g. V2X Pro-se Per Packet Priority (PPPP) mapping) is available in the RAN nodes. Note that in the context of NR V2X, enhanced Mode 3 may be referred to as Mode 1.

In Mode 3, the RAN nodes can be responsible for selecting the CCs and determining the subchannels and resources within the selected CCs for sidelink (SL) transmissions. This can be based on the UE capability e.g., number of CCs supported for parallel transmission), Pro-se Per Packet Priority (PPPP) index, QoS requirements (e.g. packet delay bound (PDB), reliability requirement, data rate), Destination ID (e.g. V2X service ID, Rx UE ID), reported CBR and channel quality indicator (CQI) measurements of the CCs/channels. For satisfying low latency and high reliability, the network sends configuration information for configuring a set of sidelink radio bearers (SL-RBs) via RRC signalling. In some embodiments, this configuration information provides configuration to support packet duplication at PDCP at the transmitting (Tx) UE. Here, each duplicate packet is simultaneously transmitted over different CCs to exploit diversity in the channel conditions. Note that the QoS requirements can be indicated in terms of QoS flow Indicator (QFI), V2X QoS flow Indicator (VQI), PPPP or PPPR. The CCs can also be referred to as sidelink carriers (SCs) where each SC consists of one or multiple radio resource pools. Each radio resource pool, in turn, can consist of a set of subchannels in the frequency domain and a set of sub-frames in the time domain.

Additionally, to ensure that the transmission power used by a given Tx UE does not interfere with other UEs in in-coverage scenario (i.e. when spectrum on the sidelink is shared on Uu interface) and out-of-coverage scenario (i.e. with other UEs in neighbouring cells), power control mechanisms on sidelink can be are applied and controlled by the RAN node (e.g., gnB).

As part of the resource allocation procedure in Mode 3, the Tx UE sends an SL SR and SL BSR to the RAN node (e.g., gNB) when there are packets to be transmitted on sidelink (i.e. packets at PDCP exceed a buffer threshold). In addition, the Tx UE also provides the destination ID of a Rx UE (for unicast transmission) or a group of Rx UEs (for broadcast, multicast or groupcast transmission) to the RAN. The destination IDs of the Rx UE(s) can be determined from the beacon signal transmitted by UEs on the V2X discovery channel. The beacon signal may contain the corresponding list of V2X services subscribed by the Rx UEs along with the UE identifier, CCs supported, reliability indicator and other QoS parameters. Next, the RAN node (e.g., gNB) determines the CCs and subchannels/resources and responds with the SL grants to be used by the Tx UE on sidelink. In the case when multiple CCs are configured for sidelink, the RAN node (e.g., gNB) may provide the activation status of the CCs on a SL MAC control element (SL MAC CE). This can be indicated in the form of a bit map in the CC Activation (CCA) SL MAC CE. Note that the activation of multiple CCs for sidelink allows the Tx UE to use different CCs to perform parallel transmission of different packets for high throughput or duplicated packets for high reliability to the Rx UE. Based on the received SL MAC CE and SL grants, the Tx UE may transmit to the Rx UE(s) directly.

For each selected CC, the Tx UE may also include the Sidelink Control Information (SCI) in the transmission to ensure that the Rx UE is able to identify and decode the received data. The SCI can contain the PRBs information within the subchannels used for transmission, the Modulation and Coding Scheme (MCS) index used on the PRBs, the reservation of the subchannels for a number of future subframes and the packet transmission counter (indicating the number of times the Tx UE will continue transmitting before subchannels are reselected). In the case when PD is required for high reliability services, the RAN node (e.g., gNB) may provide the PD activation Command (PDC) in RRC for the configured SL-RBs. Alternatively, a PD activation command may be dynamically provided by the RAN node (e.g., gNB) in a different PDC SL MAC CE to indicate the activation/deactivation of the configured SL-RBs for PD.

When both Mode 3 and Mode 4 UEs use commonly shared CCs, the information contained in the SCI can be detected and used by other Mode 4 UEs within the vicinity/range of the transmitting Mode 3 UEs to mitigate interference and packet collisions by selecting non-overlapping CCs and subchannels/resources. This requires the information in the SCI to be decodable using credentials and security parameters available to all Mode 3 and Mode 4 UEs in range. Alternatively, both Mode 3 and Mode 4 UEs can indicate the selection of CCs in a selection flag for each CC which may be sent via a groupcast or broadcast control signalling, visible to all UEs in range. Based on the detection of the CC usage, CBR and channel conditions of the shared CCs, the Mode 4 UEs can apply other Layer 1 (L1) techniques such as power control and adaptive MCS for congestion and interference mitigation. In the case when PD is activated for Mode 3 UEs, the RRC message transmitted by the RAN can be detected by the Mode 4 UEs to determine the CCs to use. Similar to paging in RAN, this mechanism may require the RRC message containing the PD activation command and the corresponding Mode 3 UE ID to be detectable by all UEs, including Mode 4 UEs, in the coverage area of the RAN nodes.

To ensure that the RAN nodes have sufficient information when selecting the CCs and allocating subchannels/resources, the Mode 3 UEs may report the CC usage of other Mode 4 UEs located within the coverage of the RAN. The CC usage information, which includes the CBR measurement, subchannel usage, PD activation status, and reservation duration (which may be obtained by decoding the SCI), can be used by the RAN nodes to mitigate congestion and interference when shared CCs are used by both Mode 3 and Mode 4 UEs.

If a V-UE requires performing transmission of periodic data (e.g. for platooning and extended sensor use cases), it may transmit an RRC reconfiguration request and SR/BSR to the RAN. The RAN may perform the configuration of the Semi-Persistent Scheduling (SPS) resources on the SL-RBs and provide the SL grants to the UE. The SPS enables the Tx UE to transmit over a certain configured period in multiple subframes without having to explicitly request for SL grants. For example, the SL grants may be proactively provided and may be valid over the configured duration. The same may apply when PD is activated for multiple CCs where the SPS is also used.

Overview of Operation in Enhanced Mode 4 in 5G

Enhanced Mode 4 based V2X communications apply in out-of-coverage scenarios where both Tx and Rx UEs are not accessible by the RAN or when the UEs are in RRC Idle state. Note that in the context of NR V2X, enhanced Mode 4 may be referred to as Mode 2.

The UEs in Mode 4 can autonomously select the CCs and resources from resource pools to support V2X transmissions on sidelink. Since the selection of the resources are performed by the UEs distributively without coordination by the RAN, it is preferable for all UEs in Mode 4 to follow a predetermined CC and subchannel selection rules/guidelines to prevent a subset of UEs from gaining a performance advantage over other UEs. In this regard, when performing PD for high reliability and low latency, the selection of the CCs and resources can be done based on commonly accessible parameters which may include CBR, Channel Occupancy Ratio (COR) and Pro-se Per Packet Priority (PPPP).

To ensure consistent operation in Mode 4, the RAN may provide CC information and resource pool information to indicate the CC and resource selection rules/guidelines to the UEs during the initial access and registration procedures. Alternatively, to support operation when the network coverage is unavailable, default guidelines can be pre-programmed in the UEs. The CC and resource selection guidelines may include any one or more of the following information: an indication of the set of pre-configured CCs allowed for sidelink communications and Mode 4 operation; a mapping between SL-RB IDs and CCs supported for PD and high throughput transmission; resource pools/subchannels within each CC and the CBR threshold for each CC (indicating the congestion at CC level); the maximum transmit power level allowable by the Tx UE; and configured sidelink grants along with the duration and periodicity for which the configured sidelink grants are valid. This information can be used by all Tx UEs operating in Mode 4 to autonomously select the CCs and the subchannels from the resource pools while adhering to the constraints and guidelines set by the RAN. Likewise, Rx UEs may use the same information to identify SL-RBs and CCs to receive packets.

Within each CC, the radio resources in the resource pools can be accessed either on contention basis (e.g. based on sensing and measurement of CBR) or pre-emptively (e.g. with limited or no sensing). When supporting PD or high throughput transmissions, the accessing of the subchannels on multiple carriers can be done in parallel. This is feasible in UEs with multiple Rx chains. Once transmission is performed, the number of subframes (i.e. time slots) used can be identified by other UEs (both Mode 4 and Mode 3) accessing the same CCs and subchannels from the resource reservation information provided in the SCI. Note that this requires that the information indicated in the SCI is decodable by all UEs in Mode 3 and Mode 4 within the vicinity/range of the Tx UE. Alternatively, the information related to CC selection can be indicated in a CC selection flag which is sent in a groupcast or broadcast control signalling to all UEs in range of the Tx UE. When PD is activated for a group of CCs associated with the SL-RB, the SL-RB ID may be sent along with the CC selection flag unencrypted in order for other UEs to assess the CC usage and load. When the Tx UE requires the transmission of critical packets, which are generally short and span over either one or a low number of fixed subframes, it may not be necessary to reserve the subchhanels/resources. In this case, the reservation related information may not be indicated in the SCI to be visible to other UEs. The UEs sensing the presence of traffic on a subchannel (i.e. CBR measurement exceeds a CBR threshold) in a given subframe, can pre-emptively transmit in the following subframe if no resource reservation indication is present in SCI.

To ensure that the transmission power used by Mode 4 Tx UE does not interfere with other UEs and that the CBR level on shared CCs is minimized in in-coverage scenario (i.e. between Mode 3 and Mode 4 UEs) and out-of-coverage scenario (i.e. with other UEs in neighbouring cells), power control and adaptive MCS techniques can be applied by the Tx UE on sidelink over multiple selected resources in different CCs. These techniques can be applied while adhering to the constraints and guidelines provided by the RAN.

To assist with resource selection, the RAN can pre-configure the subchannels on multiple CCs along with the mapping for SL-RBs using geographical indicators in cases without network coverage. The pattern for the set of CCs accessible in different geographic zones can be provided to the UEs during initial access or pre-configured in the UE by the RAN. As an example, in zone A (specified by x-y coordinates, building address, or any other suitable means) the guidelines indicating that only SL-RBs 1-2 and CCs 2-4 are accessible, can be provided or pre-configured for a UE traversing that zone. The configuration of exceptional subchannels can be supported for usage when UEs are traversing between different geographic zones in a handover scenario.

Additionally, each CC can have a validity timer associated to it to indicate the maximum number of subframes for which the selected CC can be used by a single UE. In general, different CCs associated to a common SL-RB can have different validity timer values. After selecting the CC the timer may be set and the UE can continue using the subchannels within the CC till expiry of the timer. Once the timer expires, the UE may be required to reselect CCs. This is to ensure that each UE does not unfairly occupy the CCs for prolonged periods.

In conventional sensing based CC selection approach, the Tx UE is required to sense and determine the CBR before selecting the CC for transmission. This approach may result in higher sensing and selection related latency if multiple CCs are required for transmission. Alternatively, the time-frequency usage pattern for a group of CCs may be pre-configured in a standardized format and indicated to both Mode 4 and Mode 3 UEs. In this way, a Tx UE may sense and determine the CBR of only one CC and may identify the other CCs in the group without having to explicitly sense each CC. This mechanism can be used to minimize the sensing time and reduce potential packet collisions. Likewise, the Rx UE can minimize the number of CCs it is required to sense when receiving data on multiple CCs. The same mechanism can be applied when determining the CCs to support PD where the sensing of one CC within a preconfigured group can be used to implicitly derive the CBR of other CCs in the group.

System Architecture to Support NR V2X Sidelink Communications.

The V2X services with URLLC requirements can be mapped to certain Pro-Se per packet priority (PPPP) values associated with one or multiple SL-RBs. Here, the PPPP value may represent the QoS requirement for a given service. For example, a PPPP=1 may require traffic handling with highest priority and lowest Packet Delay Bound (PDB). The PPPP value corresponding to a V2X service can be obtained from upper layers (in non-access layer at application). The PDB value for the packets associated with a V2X service can be determined directly from the PPPP using a one-to-one mapping. The reliability requirement for V2X service may be determined from the upper layers via a reliability indicator, which is different from that of the PPPP. The reliability indicator can either explicitly indicate the reliability value for a V2X service (e.g. 99.999%) or provide a quantized range (e.g. using 2 bits to indicate one of four predetermined reliability ranges). Alternatively, the reliability requirement can be determined via a configured mapping between the Destination ID or V2X Service ID to reliability. The reliability requirement can also be obtained by extending the PPPP to provide a mapping to reliability. Note that the reliability requirement may also be referred to as Pro-Se Per-Packet Reliability (PPPR). Collectively, the QoS requirements which may include latency, reliability and data rate may be indicated in the form of a QFI or VQI.

Figure 3:
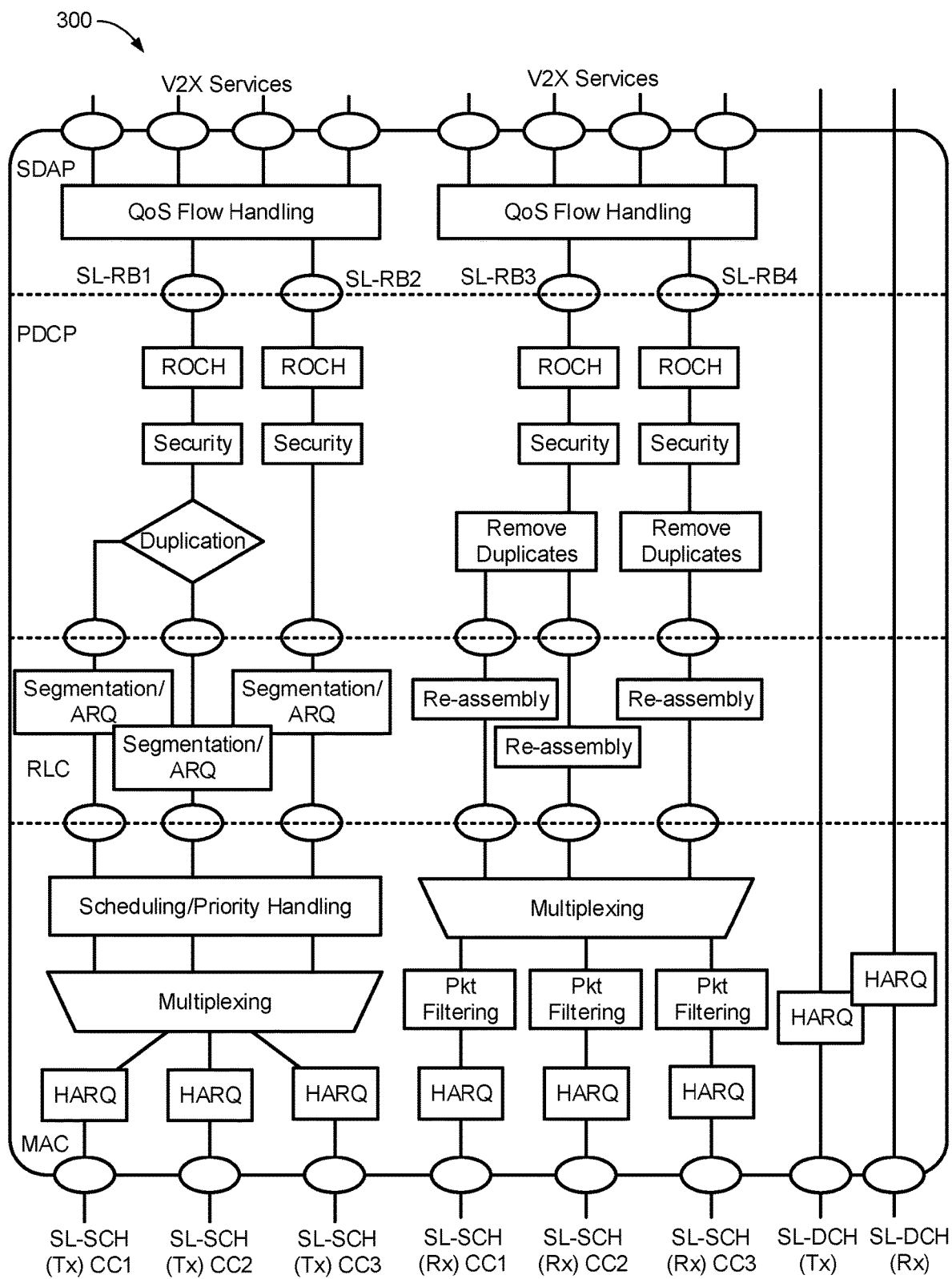
FIG. 3 is a block diagram showing a representative NR V2X Sidelink Protocol Stack.

A representative protocol stack used in the V-UEs to support multi-carrier transmission and packet duplication (PD) in the sidelink is shown in FIG. 3. The mapping between the V2X services to SL-RB can be performed at the Service Data Adaptation Protocol (SDAP) layer in the UE based on different parameters which include PPPP, PDB, reliability and other QoS requirements. Multiple V2X services with similar requirements can be mapped to a common SL-RB. Packet duplication can be configured at the radio bearer level for a set of SL-RBs by the RRC. Once PD is enabled, PD is performed at the PDCP layer, within a PDCP entity assigned to a configured SL-RB, at the Tx UE. In the RLC layer, the RRC also configures (at least) two RLC entities (for each duplicate) mapped to different logical channels, each with a distinct logical channel ID (LCD). A common MAC entity may be used in the Tx UE and is configured by RRC with channel mapping restrictions to ensure that the logical channels are mapped to different component carriers (CCs).

Figure 4:
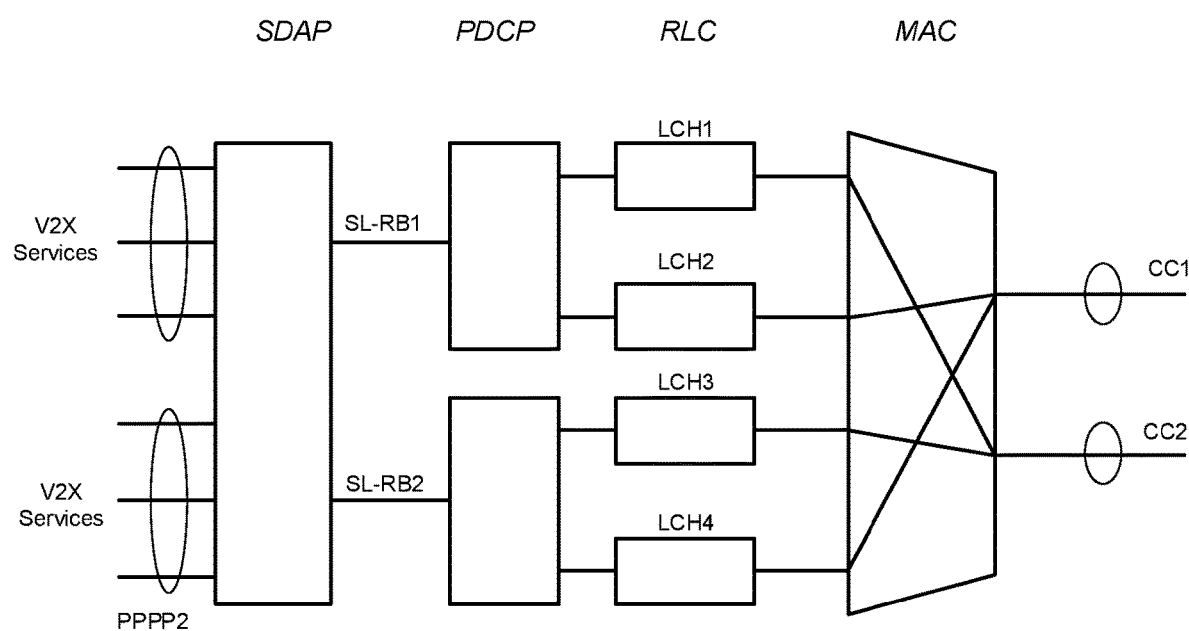
FIG. 4 is a block diagram showing a representative Packet Duplication related configuration.

For a given SL-RB, there can be one primary CC and a number of secondary CCs. The Primary CC is used as the default CC to transport the data and control packets while the secondary CCs will be used to mainly transport the data if higher throughput or higher reliability is required on sidelink. The primary CC of an SL-RB configured for PD may also carry the PD activation/deactivation indicator (sent on either a PD indicator MAC CE or SCI) to inform the other UEs if the associated secondary CCs are used for PD. The PD related configuration for mapping between V2X service to CCs is illustrated in FIG. 4.

The V2X service information may refer to the V2X service IDs, the set of QoS requirements associated with each V2X service, intended connection or transmission type (i.e. unicast, groupcast or broadcast) with a particular destination and source L2 IDs. In some embodiments, the service information can also include other service related requirements. The flow of packets generated by upper layers (i.e. V2X service/application or the V2X non-access stratum (NAS) layer) may contain QFI, transmission type indicator and the source and/or destination L2 ID in the packet header. These indications may be used to map the packets to a particular configured SL-RB. Different types of SL-RBs may be configured by RRC on the basis of i) a connection type (i.e. transmission type such as unicast, groupcast or broadcast associated with certain L2 (source, destination) ID), ii) QoS requirements (associated with QFI, VQI, PPPP or PPPR) or iii) both connection type and QoS. The mapping from i) connection type indicator (i.e. destination L2 ID and transmission type) and ii) QoS indicator (i.e. QFI) to a particular SL-RB may be done sequentially or hierarchically at the SDAP. In one embodiment, the SDAP may be configured with two packet filters as follows:
  i) A first packet filter consisting of a connection type-based filter and packet filtering/mapping rules to filter/map upper layer packets to an appropriate QoS buffer based on the connection type indicator (e.g. destination L2 ID, transmission type indicator)
  ii) A second packet filter consisting of a QoS-based filter and packet filtering/mapping rules to filter/map packets from the QoS buffer to appropriate PDCP entities associated with the SL-RBs based on QoS indicators (e.g. QFI, PPPP, PPPR)

In another embodiment, the SDAP may be configured with a packet filter consisting of a connection type-based filter and filtering/mapping rules to filter/map upper layer packets to an appropriate PDCP entity based on connection type indicator (e.g. destination L2 ID, transmission type indicator). The PDCP layer may be configured with another packet filter consisting of a QoS-based filter and filtering/mapping rules to filter/map packets received from SDAP (i.e. PDCP SDUs) to appropriate PDCP entities associated with SL-RBs based on QoS indicators (e.g. QFI, VQI, PPPP, PPPR).

At the PDCP layer, after undergoing through functions such as sequence number allocation and packet duplication, each PDCP PDU may carry a logical channel ID (LCID) in the packet header. Note that the LCID may be used as an identifier of the SL-RB and may only be visible in the access stratum (AS). The LCID may either reuse the same indicators (e.g. source L2 ID, destination L2 ID, QFI) provided by upper layers or use a different set of identifiers (with a defined mapping between the upper layer and access stratum).

The configuration information related to an SL-RB may include i) SL-RB ID (i.e LCD), ii) packet filtering rules based on connection-type indicators, destination L2 identifiers and QoS identifiers; iii) parameters corresponding to each layer in the L2 protocol stack (i.e. SDAP, PDCP, RLC, MAC, PHY) associated with the SL-RBs; iv) support for packet duplication; v) mapping rules/restrictions to map between the SL-RBs to the SL carriers, vi) information related to SL carrier information, and vii) information related to resource pool. In some embodiments, the SL-RBs may be configured on the basis of resource scheduling and communication modes (i.e. Mode 1, Mode 2). In this embodiment, the configuration information may also contain the rules/restrictions for configuring and using the SL-RBs based on the communication modes. For example a UE operating in Mode 1 (with RRC connection with the RAN node) may be provided with configuration information (i.e. rules, parameters, indicators) for certain SL-RBs capable of supporting more stringent QoS requirements (e.g. with packet duplication using high number of SCs). For other UEs operating in Mode 2, since the resources determined autonomously may be unreliable and restricted, the related configuration information for SL-RBs may only allow to satisfy limited QoS requirements (e.g. packet duplication with maximum 2 SCs). The following describes the different types of SL-RBs configurations:
  i) In the first embodiment pertaining to connection type-based SL-RB configuration, the packet flow generated by the upper layer (e.g. V2X service/application) intended for unicast transmission to a particular Rx UE with an L2 destination ID may be mapped to an SL-RB configured to support unicast transmission. Likewise, the packet flow generated by the upper layer intended for groupcast transmission to a group of Rx UEs, all UEs using a common L2 destination ID, may be mapped to an SL-RB configured to support groupcast transmission. Note that each packet flow intended for either unicast or groupcast transmission may contain one or multiple QFIs/VQIs. This refers to the scenario where a particular connection with a certain L2 destination (e.g. unicast) may support multiple QoS packet flows simultaneously. While all of these packet flows with common L2 destination ID may be mapped to the same SL-RB, further QoS related indications may be used to support differentiated QoS for packet flows with different QFI/VQI. These QoS indicators may be included within the LCID or as a separate indicator/flag in the PDCP PDU header. Based on these indicators, different QoS handling (e.g. logical channel prioritization (LCP), buffer status report (BSR) generation, and resource allocation) may be supported at the MAC layer when performing scheduling.
  ii) In the second embodiment pertaining to QoS-based SL-RB configuration, the packets with the same QoS indicators (e.g. QFI, VQI, PPPP, PPPR) in the upper layer packet headers are mapped to the same SL-RB configuration. In this case, similar to the DRBs used in the Uu interface, each SL-RB is customized to support a particular QoS flow. However, this approach maps different packet flows indicated with the same QFI to common SL-RBs even when the packets are intended for different L2 destination IDs and connection/transmission types. In this case the connection type indicators in the packet headers may be required to be visible at the lower layer (i.e. MAC) to ensure that multiplexing and scheduling packets are properly handled and transmitted to the correct sidelink destinations (i.e. unicast Rx UE or groupcast Rx UE(s)).
  iii) In the third embodiment, each SL-RB is configured for individual connection type (i.e. transmission type with an L2 destination ID) and QoS (i.e. QFI). This approach allows the MAC in the Tx UE to easily distinguish the L2 destination ID and QFI/VQI directly in the upper layer packet header or indirectly from the LCID when performing multiplexing and scheduling.

For Mode 4 V-UEs, the mapping between the SL-RB, LCIDs and CCs can be pre-configured by the network semi-statically with RRC signalling or statically for each V2X service subscribed by the UE. In this case, the semi-static configuration applies in RRC Connected or RRC Inactive modes and static configuration can be used when the UE is in RRC Idle state. For Mode 3 V-UEs, the configuration between the SL-RB, LCIDs and CCs can be done semi-statically with RRC signalling by the network.

Figure 5:
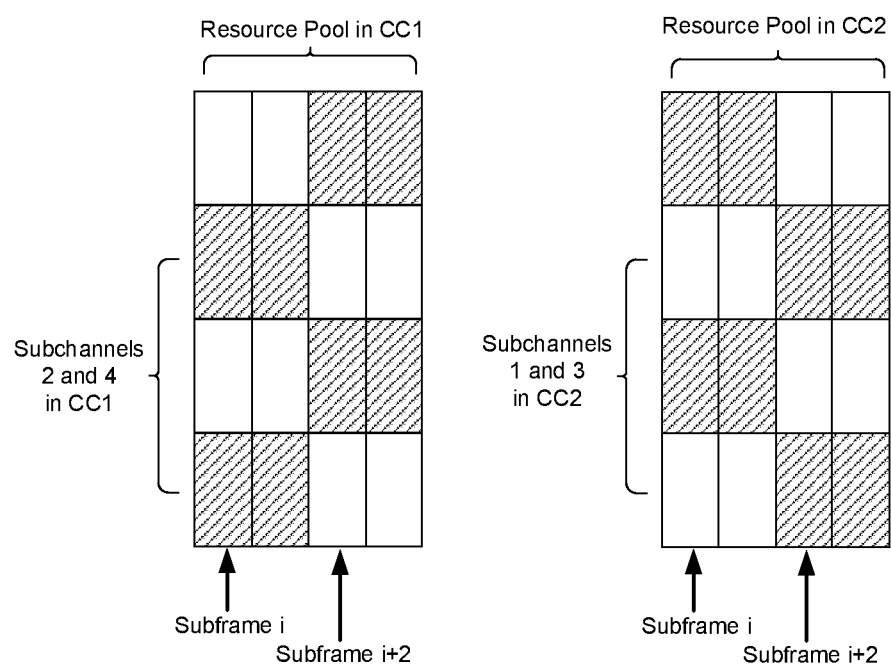
FIG. 5 is a block diagram showing a representative Resource Pool configuration in multiple CCs.

The resources in each CC may be defined in terms of a subframe-subchannel grid as shown in FIG. 5. In this case, within each subframe, specified in the time-domain, there can be multiple subchannels in the frequency domain. Each subchannel, in turn, is composed of a group of adjacent PRBs, which are used to transport the user plane and control plane data. Note that the subchannel may refer to a bandwidth part (BWP) within a CC, where different BWPs in different CCs may support a variety of numerologies (i.e. varied subcarrier spacing) in NR. A resource pool in each CC indicates the subframes and the subchannels that can be used for both Mode 3 and Mode 4 V2X communications. For supporting URLLC and PD, the resource pools from multiple CCs may be used for duplicate packet transmission in order to increase the frequency diversity. In the case when multiple subframes can be accommodated within the delay bound duration of a V2X service, the duplicate packets can be transmitted on alternating subframes and subchannels in different CCs to increase the time diversity as shown in FIG. 5. In addition, it is necessary to select the CCs and the corresponding subchannels from the resource pools that results in minimizing the congestion and potential packet collisions.

For each CC, the CBR indicates the level of congestion on the subchannels, which is determined by measuring the average reference signal strength indicator (RSSI) of the subchannels over a certain sensing period (a number of previous subframes). The channel occupancy ratio (COR) indicates the ratio of the subchannels which are utilized by other V-UEs within a coverage area and over a certain sensing period. Note that there can be one-to-one mapping between the CBR and COR and either one of the metrics can be used for selecting the CCs. In addition, after selection of CC, the resources needed for sidelink transmissions are determined and reserved based on the PDB corresponding to the V2X service, expected data size and the MCS indices. The reservation duration (number of future subframes and counter) and the corresponding resource configuration (PRB and MCS) may be indicated in the SCI.

Carrier and Resource Selection for V2X Sidelink Transmissions

To ensure that the congestion in a certain CC, and consequently the CBR, is minimized, it is necessary to either limit the transmission power or reduce the number of subchannels used in the CC. Here, a CBR threshold can be applied as an indicator to assess the usability of a CC transmission where the transmissions should only be performed if the resulting CBR value is below the CBR threshold. For PD, it is necessary to use multiple CCs and, correspondingly, multiple CBR threshold values to guarantee that the resulting congestion from transmissions does not adversely affect the overall transmission reliability.

The steps involved in CC selection and subchannel selection to support PD on the sidelink transmission can be performed as follows:

Step 1: Given a V2X service and a CC selection duration, the list of supported CCs (or channels) is obtained from the upper layers (non-access). Here, the V2Xservice-to-CC provides the mapping between the V2X service (application) and the supported CCs (channels). In addition, a pre-configured SL-RB ID-to-CC mapping (configured by RRC) may be used to determine the initial list of CCs. A number of LCIDs, each associated to a CC, can also be pre-configured to an SL-RB. The intersection between the V2Xservice-to-CC and SL-RB ID-to-CC provides the initial list of CCs.

Step 2: The PPPP index along with other services requirements indicating the traffic priority, reliability, PDB and transmission rate associated with the V2X service, are used to select a subset of CCs as candidates from the initial list (obtained step 1).

Step 3: A configured PPPP-to-CBRthreshold mapping (provided via RRC or pre-configured in the UE) is used together with the CBR measurements to determine a subset of CCs identified from the previous step (step 2). Typically, a higher priority service (low PPPP index) maps to a lower CBR threshold value. For example Priority(PPPP1)>Priority (PPPP2) translates to Threshold(CBR1)<Threshold(CBR2) for a given CC k. For PD, the selection of multiple CC can be done jointly considering the CBR measurements of all CCs (in step 2) and the PPPP-to-CBRthreshold mapping.

Step 4: From the selected CCs, the subchannels required for transmissions are determined from the corresponding resource pools based on Layer 1 parameters (e.g. RSSI) and SCI sent by other UEs in the vicinity range or selected randomly.

Step 5: After subchannel selection, the duration for which the resources are reserved is determined based on the PDB, data rate and the number of repetitions supported. This is done for the subchannels in each of the selected CC. The reservation duration for the subchannels and CCs is then indicated in the SCI.

Step 6: If a resource reselection trigger is received due to RRC reconfiguration request from network, change in UE's geo-location, expiry of resource reservation timer/counter, or change in CBR measurements, steps 3-5 may be repeated (i.e. new CCs and subchannels are reselected).

In the CC/subchannel selection procedure, steps 1-3 can be performed via RRC (between UE and RAN) and steps 4-6 can be performed at the MAC layer (in UE). Here, after selecting the CCs (steps 1-3), the RRC may reconfigure the SL-RBs and LCIDs and indicates the selected CCs to the MAC entity. The scheduler associated with MAC determines the subchannels along with the PRBs from the resource pools in the selected CCs (steps 4-6).

In Mode 3, the CCs and subchannels/resources are determined by the gNB based on the CBR measurements, reported CQI, Destination IDs (i.e. PPPP, V2X service ID, Rx UE ID or Group ID for set of Rx UEs) and SL SR/SL BSR provided by the Tx UE. In this case, the gNB may also select the CCs and allocate resources for all UEs by ensuring that there is no congestion and interference in the sidelink transmissions within its coverage area.

In Mode 4, both the CCs and subchannels are determined by the Tx UE based on criteria or guidelines, which may include the V2Xservice-to-CC, SL-RB ID-to-CC and PPPP-to-CBRthreshold mappings, provided by the gNB. Alternatively, the gNB may select the CCs and the Tx UE may select the subchannels and the corresponding resources. In this case, the CCs can be selected based on the pre-configured geo-location (zones) information and associated time period values. By ensuring that the CCs assigned to adjacent zones are different and spaced adequately enough, it is possible to mitigate the interference from the neighbouring zones.

To support PD, it is necessary for the Tx UE to take into account of the CCs monitored by the Rx UE. The Rx UE (e.g. P-UE) may have limited capability in monitoring all CCs used on sidelink or may have powered off a subset of the Rx chains to minimize power consumption. To ensure that the CCs selected by the Tx UE are aligned with the CCs used and monitored by the Rx UE, the Tx UE can either i) determine the Rx UEs in its coverage area and the corresponding CCs used from the discovery channel (beacon) or ii) use a pre-configured V2Xservice-to-CC and SL-RB ID-to-CC mappings applicable to both Tx UEs and Rx UEs To mitigate the congestion level and ensure that the CBR remains below the CBR threshold values, the Tx UE may apply number of techniques when selecting the CCs. These techniques include packet transmission rate adaptation (based on traffic volume in buffer), sidelink power control and limit the transmission duration. Additionally, it should be possible for the Tx UE to use adaptive MCS at the PHY layer on different selected CCs and subchannels based on the channel conditions (measured on the reference signals transmitted by Rx UE) to improve the reliability and minimize the UE usage of resources.

Support of Packet Duplication on Sidelink

Packet duplication can be performed on sidelink transmissions to ensure certain V2X services (e.g. platooning) satisfy the high reliability and low latency requirements. An example of the PPPP-to-CBRthreshold mapping between different V2X services to CBR threshold values to support PD using multiple CCs is shown in the Table of FIG. 6. Each V2X service is associated with a PPPP indicator and is represented with an SL-RB ID. Note that a number of SL-RBs configured with multiple CCs (e.g. SL-RB ID 1 to 3) can support PD while SL-RBs configured with a single CC do not support PD. For each SL-RB, one of the CC is configured as the primary (default) CC while the remaining CCs are used to transport the duplicate packets when PD is activated. When PD is deactivated, the packets are sent via the primary CC. The parameters in Table 1, which include the SL-RB-to-CCs mapping, CBR thresholds for each CC, CBR variance for each CC, sensing duration, reliability requirement and the associated PPPP for each SL-RB, may be configured by the RAN in the UEs via RRC (for Mode 3 and Mode 4) or pre-configured within the UE (for Mode 4).

In typical operation, after configuring the SL-RBs the Tx UE monitors the CCs over a sensing period, T_sense=[0, T_max] and determines the CBR values. Once the CCs are selected they can be reserved for a reservation duration, T_reserve=[Tr_min, Tr_max]. The reservation duration may be determined based on the PDB requirement for the V2X packet, where typically T_reserve>=PDB. A common T_sense can be used for SL-RBs configured for PD so that all CCs mapped to the SL-RB use the same T_sense. Alternately, for more flexibility, different T_sense values can be used for each CC. In this case, for making the CC selection decision the measured CBR value, $CBR_{CC}$ is compared with respect to the configured CBR threshold, $CBR^{th}$. Generally, the CC can be selected if $CBR_{CC}<=CBR^{th}$. Note that a higher reliability and priority requirement for a given SL-RB translates to lower $CBR^{th}$, hence ensuring lower congestion and minimal probability of error/failure for any of the configured CCs.

Also, in FIG. 6, $\Delta CBR=f(1/T\_sense)$ refers to the variance or uncertainty in the CBR measurement. Typically, longer sensing period translates to smaller CBR variance, where increasing T_sense to T_max translates to reducing $\Delta CBR$ to 0. However, for satisfying the URLLC requirement, it may be necessary to make a faster CC selection decision with either limited or no sensing (i.e. T_sense<<T_max), which may result in increasing the CBR variance by $\Delta CBR$. To account for the uncertainly in the CBR measurement due to limited or no sensing, a different threshold for the CBR variance, $\Delta CBR^{th}=\Delta T\_sense$) is introduced and included as a reduction offset when making the CC selection decision. Here, a CC with variance in CBR measurement may be selected only if $CBR_{CC}+\Delta CBR<=CBR^{th}-\Delta CBR^{th}$.

When performing PD the same packet is transmitted over multiple CCs, each experiencing independent and uncorrelated channel conditions. In this case it may be possible to satisfy the overall reliability requirement R for the SL-RB even when the measured CBR value and CBR variance (i.e. $CBR_{CC}+\Delta CBR$) of individual CCs exceed the CBR threshold value (i.e. $CBR^{th}-\Delta CBR^{th}$). This also implies that when multiple CCs are used with PD, it would be possible to reduce to sensing time and consequently, the accuracy for CBR measurement for each CC without adversely affecting the reliability requirement. Alternatively, when more accurate measurement of the CBR is available due to longer sensing period or CBR feedback reports (from access nodes or other UEs), it would be feasible to reduce the number of CCs required and deactivate PD.

The following steps describe a method to determine the CCs using the PPPP-to-CBRthreshold mapping to support PD for sidelink transmissions. For a given protocol data unit (PDU) with PPPP index i, the selection of CCs for PD is performed by selecting the best k CCs out of the n available candidate CCs. Note that when k=1 PD can be deactivated and a single CC is used for transmitting the PDU and when k>1 PD can be activated. Given a certain sensing duration, T_sense=[0,T_max], during which the CBR and CQI of the n available CCs are monitored by the UE, the steps involved in determining CCs are as follows:

Step 1: If the $CBR_{CC_p}+\Delta CBR_{CC_p}<=CBR^{th}-\Delta CBR^{th}$, $CQI_{CC_p}>CQI^{th}$ and the resources (i.e. subchannels) available on the primary $CC_p$ are sufficient to meet the reliability requirement R for SL-RB i (i.e. PPPP i), $CC_p$ is selected for sidelink transmission of V2X PDU and PD is deactivated.

Step 2: If $CBR_{CC_p}+\Delta CBR_{CC_p}>CBR^{th}-\Delta CBR^{th}$ and $CQI_{CC1}$ and the resources available on the primary link $CC_p$ are not sufficient to meet the reliability requirement then the second best CC is considered along with the primary link $CC_p$ for PD. The second best CC should satisfy the following criteria: i) $CBR_{CC2}+\Delta CBR_{CC2}<=CBR^{th}-\Delta CBR^{th}$, ii) $CQI_{CC1}>CQI^{th}$, iii) the resources available on the second best CC is above a resource threshold and iv) the combined measured CBR values of the primary and second best CCs satisfy the reliability requirement (i.e. $R<=1-CBR_{CC_p} CBR_{CC2}$).

Step 3: If the two best CCs are not sufficient to meet the reliability requirement then the third best CC is considered. The third best CC should also satisfy the above requirements for combined CBR, $CQI^{th}$ and resource threshold.

Step 4: This procedure may be repeated until the overall reliability requirement R is satisfied or all n of the candidate CCs are exhausted.

V2X Sidelink Transmissions for URLLC

Enhanced Mode 3 Carrier/Resource Selection (In Coverage)

Figure 7:
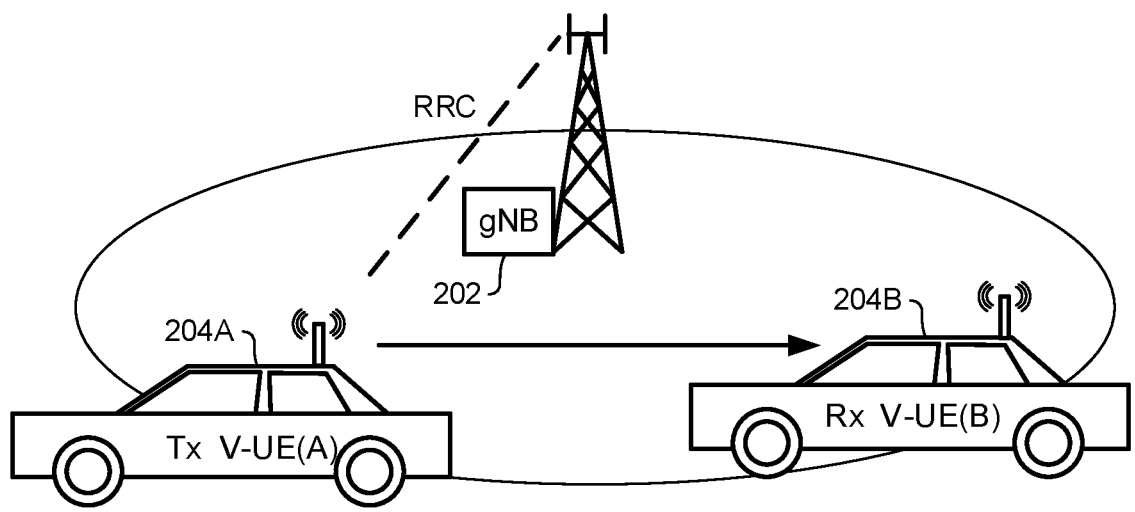
FIG. 7 is a block diagram showing representative relationships between (R)AN elements for Mode 3 Resource Allocation for PD when both Tx-UE and Rx-UE are within coverage of gNB.
Figure 8:
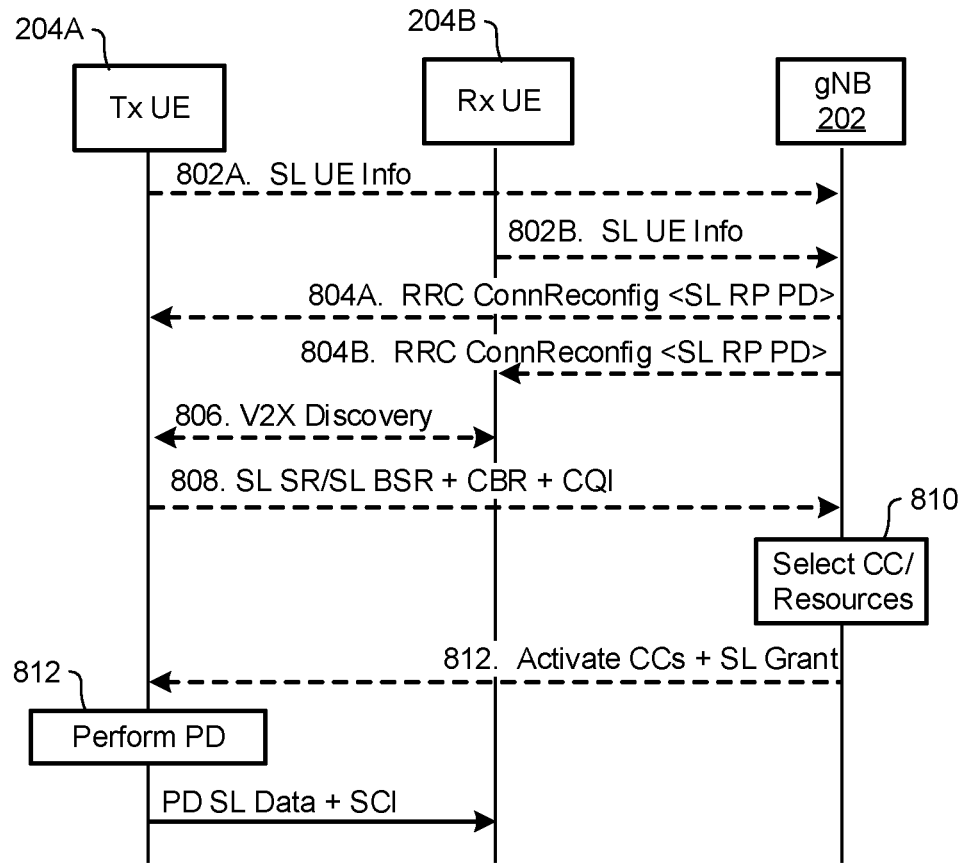
FIG. 8 is a message flow diagram showing a representative process for Mode 3 Resource Allocation for PD when both Tx-UE and Rx-UE are within coverage of gNB.

The Mode 3 (In coverage) transmission with PD is illustrated in FIG. 7. A representative procedure is illustrated in FIG. 8 and described below:

Step 802: Both the Tx UE and Rx UE in Mode 3 provide the SL UE information (i.e. PPPP, reliability, CCs supported)

in the RRC request to the RAN node (gNB). The SL UE information may also refer to the UE capability information comprising of UE ID, supported resource allocation modes (i.e. Mode 1, Mode 2, both), supported radio access technologies (e.g. LTE V2X, NR V2X), and RF capability which includes supported Sidelink carrier frequency bands, UE class information corresponding to maximum transmit power supported, number of Tx/Rx chains supported, and channel sensing, measurement and reporting capability.

Step 804: The RAN (gNB) configures the SL-RBs and CCs for sidelink transmission (with and without PD). In some embodiments, the RAN configures the SL-RBs and CCs for sidelink transmission (with and without PD) by transmitting configuration information. The SL-RB configuration mapping (i.e. SL-RB-to-LCIDs, LCID-to-CCs) to support PD and multi-CC transmissions is provided to Tx UE and Rx UE. The RAN (gNB) may also request the transmission of the sidelink channel CBR and CQI for the configured CCs.

Step 806: When the Tx UE and Rx UEs are within a certain proximity distance, the V2X services (PPPP) supported by each other are determined via the V2X discovery channel (beacon).

Step 808: If the Tx UE has packets for transmission, the SL SR and SL BSR requests are provided to the RAN node (gNB). The Tx UE may also provide the Destination ID attributed to Rx UE ID along with the sidelink channel CQI and CBR to gNB. In the presence of other Mode 4 UEs, the Tx UE may report the sidelink channel CQI and CBR of the configured CCs used by the Mode 4 UEs to gNB.

Step 810: The RAN node (gNB) determines the CCs and resources for sidelink transmission based on the traffic volume, reported CBR and sidelink channel CQI of CCs used all Mode 3 and Mode 4 V-UEs in its coverage area Step 812: If PD is required, the RAN node (gNB) activates multiple CCs and provides the SL grants. The activation of CCs for PD may be performed semi-statically via RRC or dynamically via MAC CE for sidelink CCs.

Step 814: Tx UE enables PD at PDCP and performs transmission of duplicated packets to Rx UE over multiple sidelink CCs to satisfy the reliability requirement.

Enhanced Mode 3 Carrier/Resource Selection (Partial Coverage)

Figure 9:
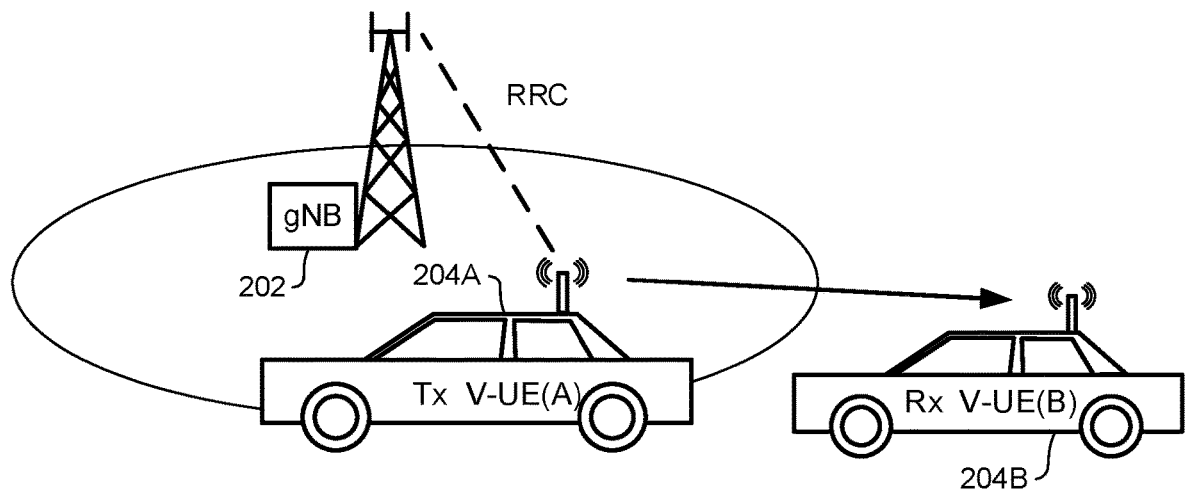
FIG. 9 is a block diagram showing representative relationships between (R)AN elements for Mode 3 Resource Allocation for PD when Tx-UE is within coverage of gNB and Rx-UE is out of coverage.
Figure 10:
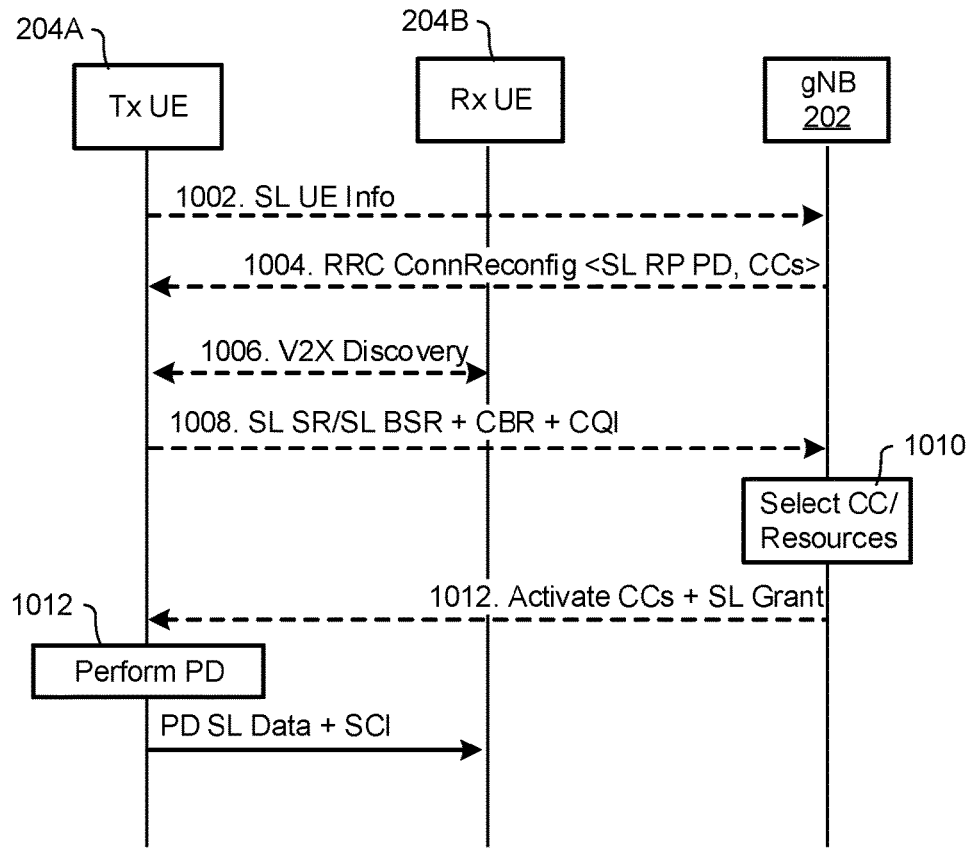
FIG. 10 is a message flow diagram showing a representative process for Mode 3 Resource Allocation for PD when Tx-UE is within coverage of gNB and Rx-UE is out of coverage.

The Mode 3 (partial coverage) transmission with PD is illustrated in FIG. 9. A representative procedure is illustrated in FIG. 10 and described below:

Step 1002: The Tx UE provides the SL UE information (i.e. PPPP, reliability, CCs supported) in the RRC request to the RAN node (gNB).

Step 1004: The RAN node (gNB) configures the SL-RBs and CCs for sidelink transmission (with and without PD). The SL-RB configuration mapping (i.e. SL-RB-to-LCIDs, LCID-to-CCs) to support PD and multi-CC transmissions is provided to Tx UE. The gNB may also request the transmission of the sidelink channel CQI for the configured CCs.

Step 1006: The Tx UE and Rx UEs, located within a certain proximity distance, discover the V2X services supported by each other via the V2X discovery channel. The Rx UE can be either in RRC Idle state or in Mode 4.

Step 1008: If the Tx UE has packets for transmission, the SL SR and SL BSR requests are provided to the RAN node (gNB). The Tx UE may also provide the Destination ID attributed to Rx UE ID along with the sidelink channel CQI and CBR to RAN node (gNB). In the presence of other Mode 4 UEs, the Tx UE may report the sidelink channel CQI and CBR of the configured CCs used by the Mode 4 UEs to RAN node (e.g. gNB).

Step 1010: The RAN node (gNB) determines the CCs (considering the CC supported at Rx UE) and resources for sidelink transmission based on the traffic volume, reported CBR and sidelink channel CQI of CCs used all Mode 3 and Mode 4 V-UEs in its coverage area.

Step 1001: If PD is required, the RAN node (gNB) activates multiple CCs and provides the SL grants. The activation of CCs for PD may be performed semi-statically via RRC or dynamically via MAC CE for sidelink CCs.

Step 1012: Tx UE enables PD at PDCP and performs transmission of duplicated packets to Rx UE over multiple sidelink CCs to satisfy the reliability requirement.

Enhanced Mode 3 Carrier/Resource Selection (Inter-gNB Coverage)

Figure 11:
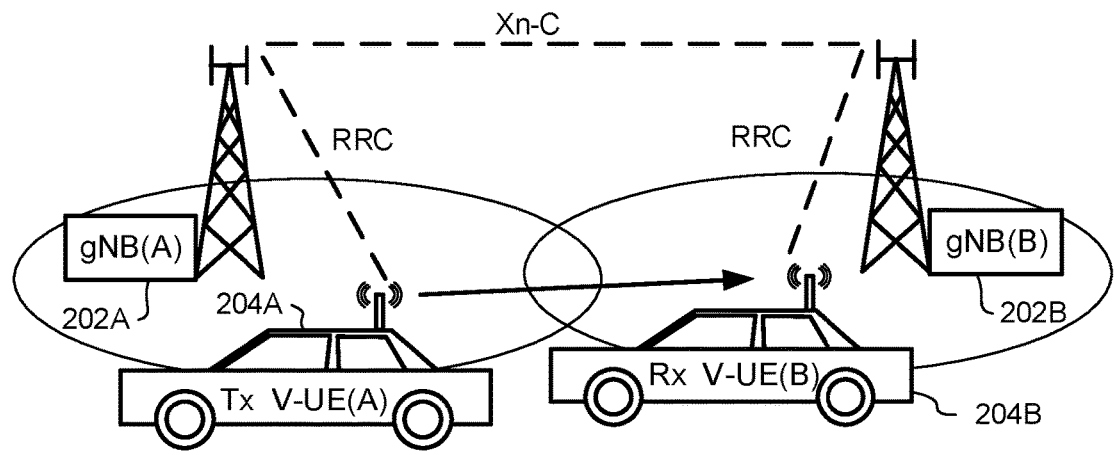
FIG. 11 is a block diagram showing representative relationships between (R)AN elements for Mode 3 Resource Allocation for PD when Tx-UE and Rx-UE are within respective coverage areas of two different Access Points.
Figure 12:
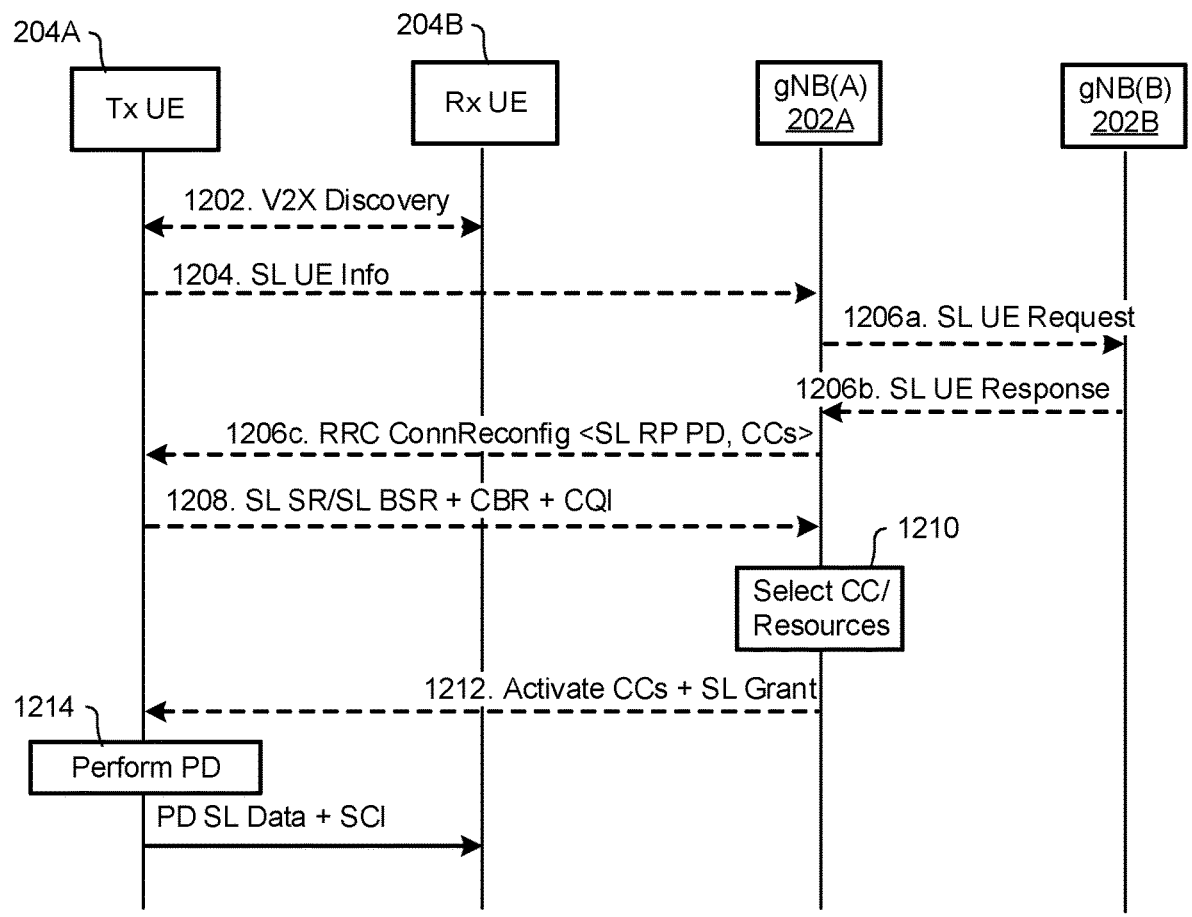
FIG. 12 is a message flow diagram showing a representative process for Mode 3 Resource Allocation for PD when Tx-UE and Rx-UE are within respective coverage areas of two different Access Points.

The Mode 3 (Inter-gNB coverage) transmission with PD is illustrated in FIG. 11. A representative procedure is illustrated in FIG. 12 and described below:

Step 1202: The Tx UE and Rx UE, within a certain proximity distance, discover the V2X services (i.e. Destination ID, PPPP, reliability, CCs) supported by each other. Tx UE is associated with a first RAN node (gNB(A)) and Rx UE is associated with a second RAN node (gNB(B)).

Step 1204: The Tx UE provides the updated SL UE information (i.e. PPPP, reliability, CCs supported) in the RRC request to the first RAN node (gNB(A)). The Tx UE may also provide the Destination ID attributed to Rx UE ID.

Step 1206: The first RAN node (gNB(A)) configures the SL-RBs and CCs for sidelink transmission (with and without PD). This is done after sending a request and receiving a response from the second RAN node (gNB(B)) regarding the SL-RBs and CC configured for Rx UE. The updated SL-RB configuration mapping is provided to the Tx UE. The first RAN node (gNB(A)) may also request the transmission of the sidelink channel CQI for the configured CCs.

Step 1208: If the Tx UE has packets for transmission, the SL SR and SL BSR requests are provided to the first RAN node (gNB(A)) 202A. The Tx UE provides the sidelink channel CQI and CBR to the first RAN node (gNB(A)) 202A. In the presence of other Mode 4 UEs, the Tx UE may report the sidelink channel CQI and CBR of the configured CCs used by the Mode 4 UEs to the first RAN node (gNB(A)) 202A.

Step 1210: The first RAN node (gNB(A)) determines the CCs (considering the CC supported at Rx UE) and subchannels/resources for sidelink transmission based on the traffic volume, reported CBR and sidelink channel CQI of CCs used all Mode 3 and Mode 4 V-UEs in its coverage area Step 1212: If PD is required, the first RAN node (gNB (A)) activates multiple CCs and provides the SL grants. The activation of CCs for PD may be performed semi-statically via RRC or dynamically via MAC CE for SL carriers.

Step 1214: Tx UE enables PD at PDCP and performs transmission of duplicated packets to Rx UE over multiple sidelink CCs to satisfy the reliability requirement.

Enhanced Mode 4 Carrier/Resource Selection (In Coverage)

Figure 13:
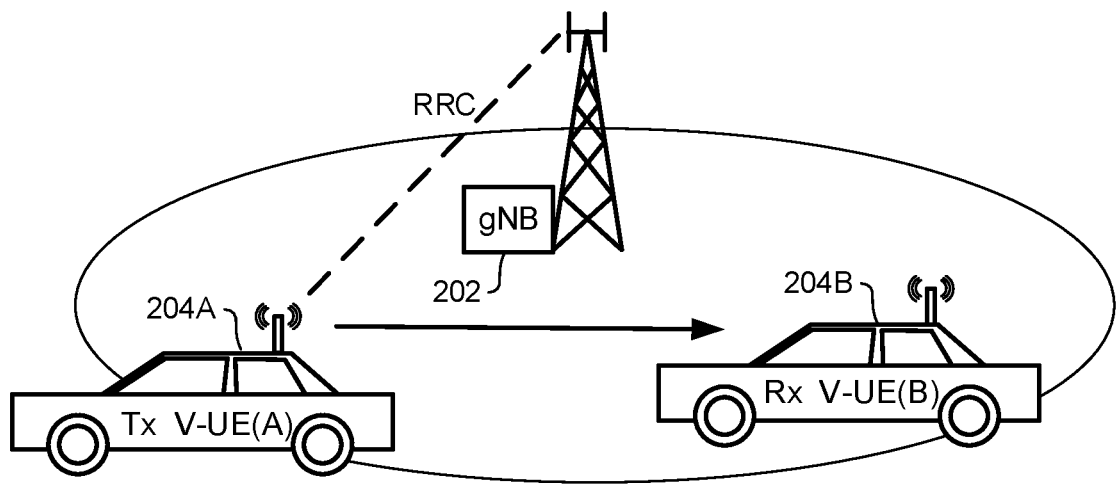
FIG. 13 is a block diagram showing representative relationships between (R)AN elements for Mode 4 Resource Allocation for PD when Tx-UE is in RRC Connected state and Rx-UE is out of coverage.
Figure 14:
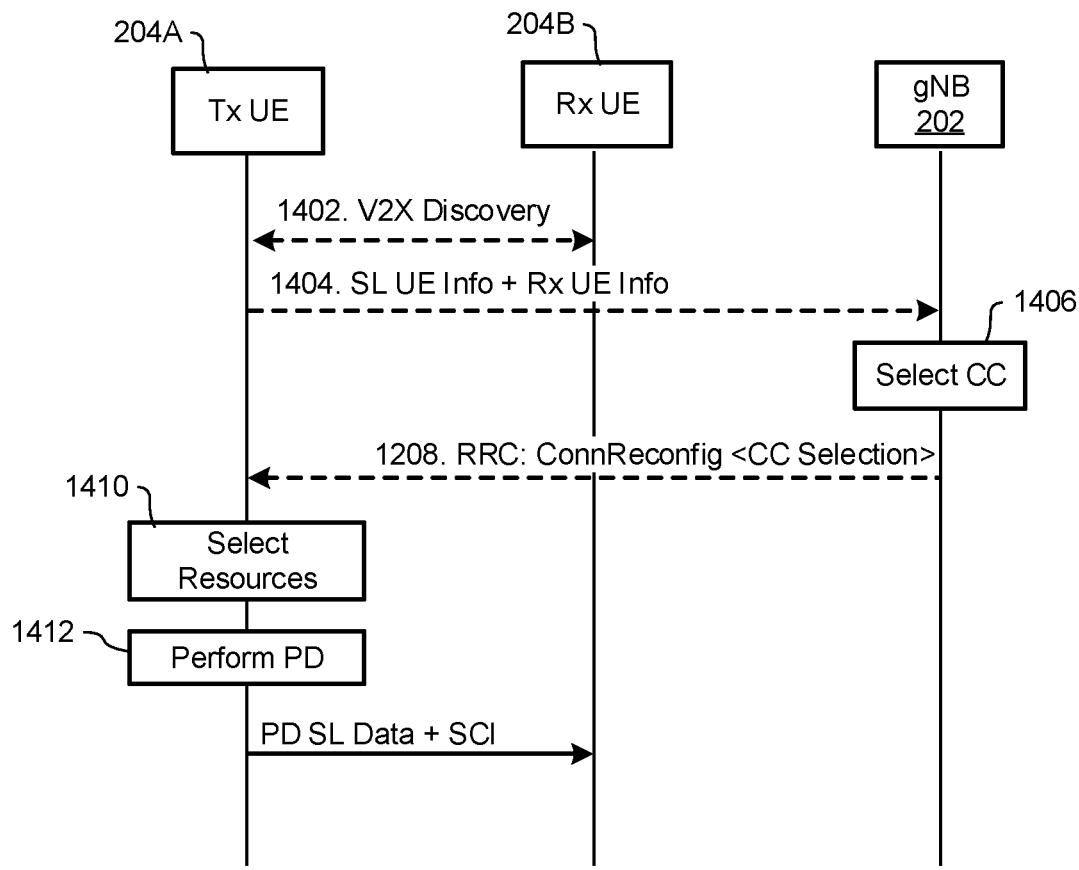
FIG. 14 is a message flow diagram showing a representative process for Mode 4 Resource Allocation for PD when Tx-UE is in RRC Connected state and Rx-UE is out of coverage.

The Mode 4 (In coverage) transmission with PD is illustrated in FIG. 13. A representative procedure is illustrated in FIG. 14 and described below:

Step 1402: When the Tx UE and Rx UE are within a certain proximity distance, the V2X services (i.e. Destination ID, PPPP, reliability, CCs) supported by each other are determined via the V2X discovery channel.

Step 1404: The Tx UE in either RRCConnected or RRCInactive state provides the updated SL UE information (i.e. PPPP, reliability, CCs supported) and the information of Rx UE (Destination ID, PPPP, reliability, CCs supported) in the RRC request to the gNB Step 1406: The gNB updates the configuration of the SL-RBs and CCs for sidelink transmission (with and without PD) considering the CCs used by all Mode 3 and Mode 4 UEs in its coverage area. The gNB may also select the CCs associated with the SL-RB for Mode 4 UEs in RRCConnected state.

Step 1408: The updated SL-RB configuration mapping and the selected CCs is provided to Tx UE. If CCs are not selected, the RAN node (gNB) provides CC selection rules/guideline to the Tx UE.

Step 1410: If CCs are not selected by RAN node (gNB), the Tx UE selects the CCs based on the CC selection rules/guidelines. If the Tx UE has packets for transmission, the Tx UE autonomously selects subchannels/resources from the resource pools in the identified CCs.

Step 1412: Tx UE enables PD at PDCP and performs transmission of duplicated packets to Rx UE over multiple sidelink CCs to satisfy the reliability requirement.

Enhanced Mode 4 Carrier/Resource Selection (Out of Coverage)

Figure 15:
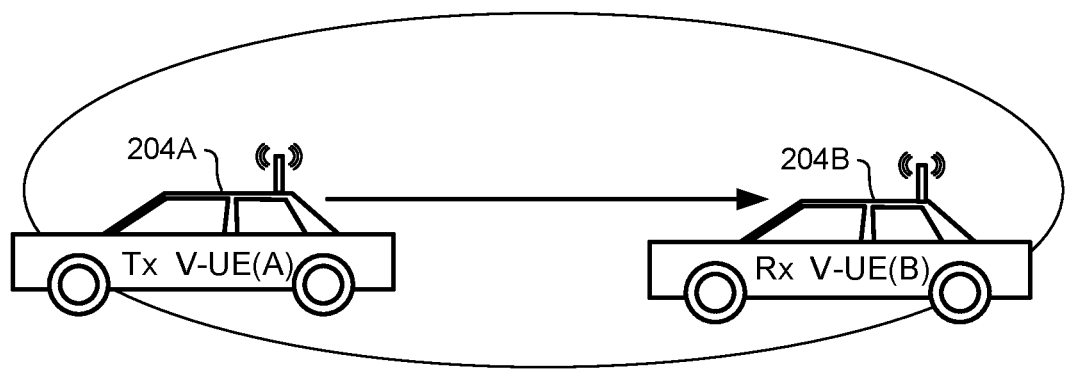
FIG. 15 is a block diagram showing representative relationships between (R)AN elements for Mode 4 Resource Allocation for PD when both Tx UE and Rx UE are out of coverage of any gNBs.
Figure 16:
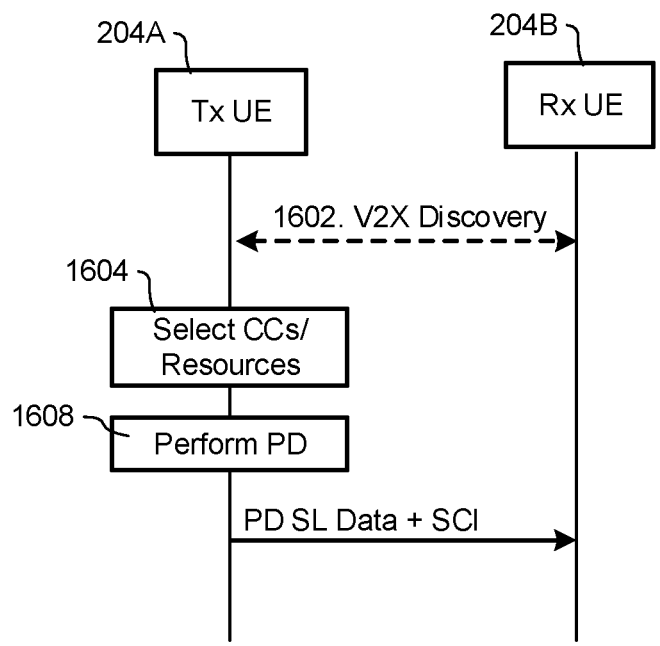
FIG. 16 is a message flow diagram showing a representative process for Mode 4 Resource Allocation for PD when both Tx UE and Rx UE are out of coverage of any gNBs.

The Mode 4 (Out of coverage) transmission with PD is illustrated in in FIG. 15. A representative procedure is illustrated in FIG. 16 and described below:

Step 1602: When the Tx UE and Rx UE are within a certain proximity distance, the V2X services (i.e. Destination ID, PPPP, reliability, CCs) supported by each other are determined via the V2X discovery channel.

Step 1604: The pre-configured SL-RB mapping (based on PPPP-to-CC mapping) is used by Tx UE to select the CCs. The CBR is measured on the selected CCs. If the Tx UE has packets for transmission, the Tx UE autonomously selects subchannels/resources from the resource pools in the identified CCs.

Step 1608: Tx UE enables PD at PDCP and performs transmission of duplicated packets to Rx UE over multiple sidelink CCs to satisfy the reliability requirement Dynamic Control of Packet Duplication on Sidelink RRC based semi-static configuration of the SL-RBs for PD on sidelink can reduce the signalling in both the Tx UE and Rx UE. This is because, once the CCs are selected for PD semi-statically, the Tx UE and Rx UE can perform the internal mapping between the SL-RBs and logical channels over multiple CCs. However, configuring the SL-RBs for PD at all times using multiple CCs may be wasteful and may increase congestion, especially when using shared resource pools. In this case, a fast mechanism to activate and deactivate PD on the configured SL-RBs based on changes in the channel conditions and CBR will be useful to minimize the resource usage, congestion and reduce the signalling delay.

In Mode 4, since the enforcement of PD decision is made in the Tx UE, it is necessary for the Tx UE to indicate to the Rx UE the activation status of PD and the CCs used on the configured SL-RB. This is to enable the Rx UE, which may have limited Rx chains, to monitor only the relevant CCs. The same applies when the Tx UE deactivates PD and uses only one (primary) CC for transmission. The Tx UE can provide the PD activation/deactivation status in the SCI, sent on the selected CCs, to the Rx UE to properly receive the transmitted packets. This requires the SCI to carry a PD activation flag.

In Mode 4, the Rx UE can perform the CBR and channel measurements to determine if PD should be activated or deactivated. Based on the measurements, the Rx UE can provide indication to the Tx UE on a PD indicator MAC CE for the configured set of SL-RBs and CCs. For example, if the transmitted packets are received successfully at Rx UE on the primary CC, an indication to deactivate PD can be provided as a feedback to the Tx UE in the PD indicator MAC CE. To ensure that other V2X UEs (in both Mode 3 and Mode 4) in the vicinity range are able to accurately assess the CC usage, the PD activation/deactivation indicator in MAC CE may be sent with the Tx UE ID on signalling decodable by other UEs. Note that the PD indicator MAC CE, sent by the Rx UE to the Tx UE over the sidelink, may apply in both unicast and groupcast scenarios. Similar to the unicast scenario, the Tx UE may use the individual PD indicator MAC CEs received from all Rx UEs or a subset of Rx UEs in the group to determine the decision to activate/deactivate PD in the set of configured SCs and SL-RB used for groupcast transmission.

In Mode 3, the gNB may obtain the CBR and the channel measurements on the configured CCs from other V2X UEs in its coverage area. In this case, the sidelink PD activation/deactivation decision can be made in the network. Based on this, the command/trigger to activate/deactivate PD can be provided semi-statically in the RRC or dynamically in an SL-PD MAC CE to the Tx UE for enforcing the decision. To ensure that other V2X UEs in Mode 4 in the coverage area of RAN node (gNB) are able to accurately assess the CC usage, the PD activation/deactivation command in RRC or SL-PD MAC CE may be sent with the Tx UE ID on a signalling decodable by other UEs.

It also should be possible to consider other parameters such as the relative velocity of the UEs to determine the choice of PD activation (i.e. number of CCs to use for PD) due to the presence of Doppler diversity. This is because the increase in Doppler diversity reduces the correlation between the CCs, thereby requiring fewer numbers of CCs for PD while satisfying the reliability requirement. In this case, as the relative velocity increases beyond a certain velocity threshold, it may be possible to deactivate PD and fall back to the primary CC and activate PD if the relative velocity falls below the threshold.

Dynamic Control of PD in Enhanced Mode 3

Figure 17:
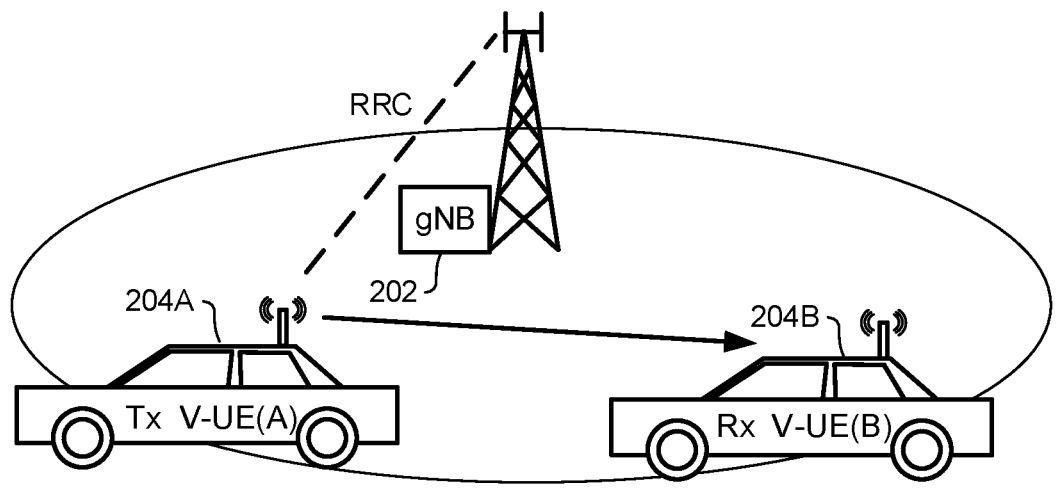
FIG. 17 is a block diagram showing representative relationships between (R)AN elements for Mode 3 Dynamic Activation/Deactivation of PD.
Figure 18:
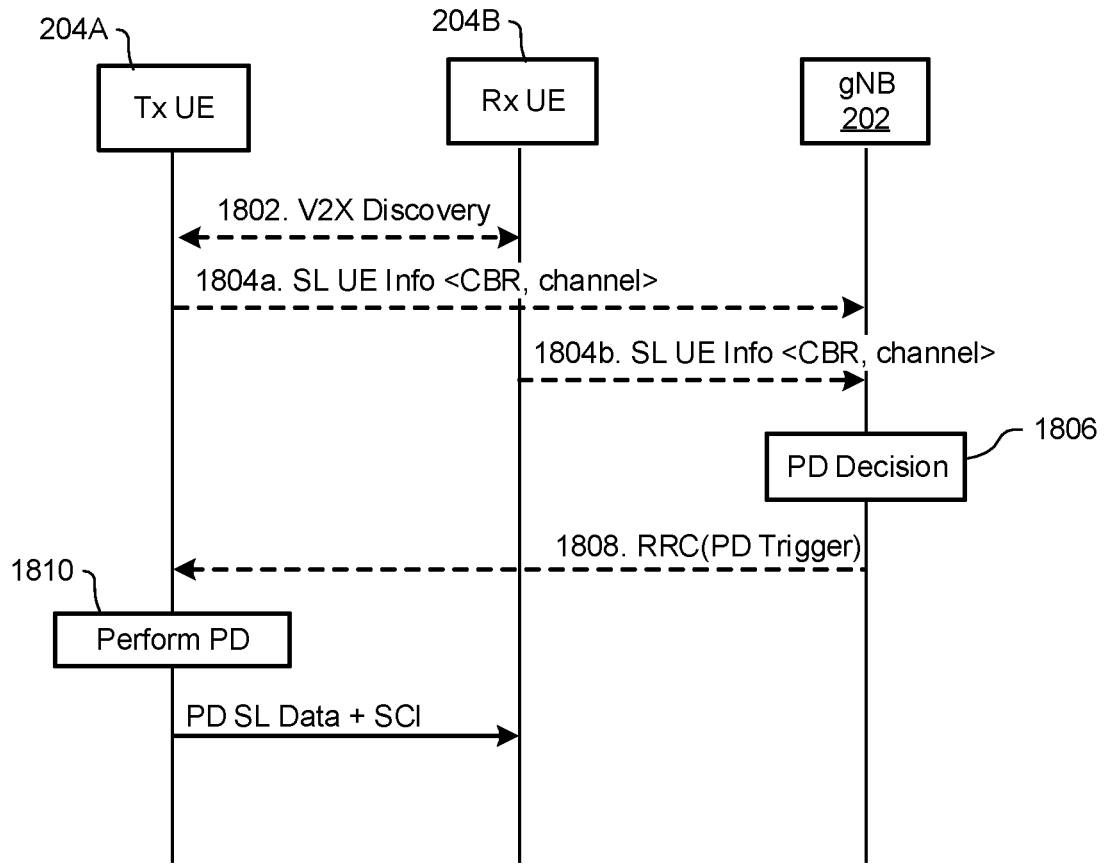
FIG. 18 is a message flow diagram showing a representative process for Mode 3 Dynamic Activation/Deactivation of PD.

The dynamic activation/deactivation of PD in Mode 3 is illustrated in FIG. 17. A representative procedure is illustrated in FIG. 18 and described below:

Step 1802: When the Tx UE and Rx UEs are within a certain proximity distance, the V2X services (i.e. Destination ID, PPPP, reliability, CCs) supported by each other are determined via the V2X discovery channel.

Step 1804: Both the Tx UE and Rx UE in Mode 3 may provide SL UE information (i.e CBR and channel measurements on the configured CCs) to the RAN node (gNB). The measurement information is linked to the SL-RB previously configured by RAN node (gNB) in the UEs.

Step 1806: Based on the CBR and channel measurements, the RAN node (gNB) makes the decision to activate PD on the previously configured SL-RB.

Step 1808: The RAN node (gNB) provides the PD activation trigger in RRC to the Tx UE.

Step 1810: Tx UE enables PD at PDCP and performs transmission of duplicated packets to Rx UE over multiple sidelink CCs to satisfy the reliability requirement Steps 1804 to 1808 may be repeated when there is a need to deactivate PD.

12.1. Dynamic Control of PD in Enhanced Mode 4

Figure 19:
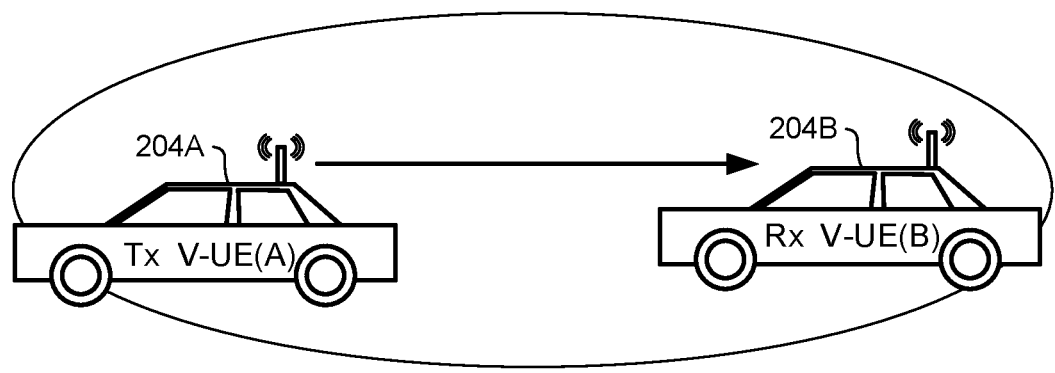
FIG. 19 is a block diagram showing representative relationships between (R)AN elements for Mode 4 Dynamic Activation/Deactivation of PD.
Figure 20:
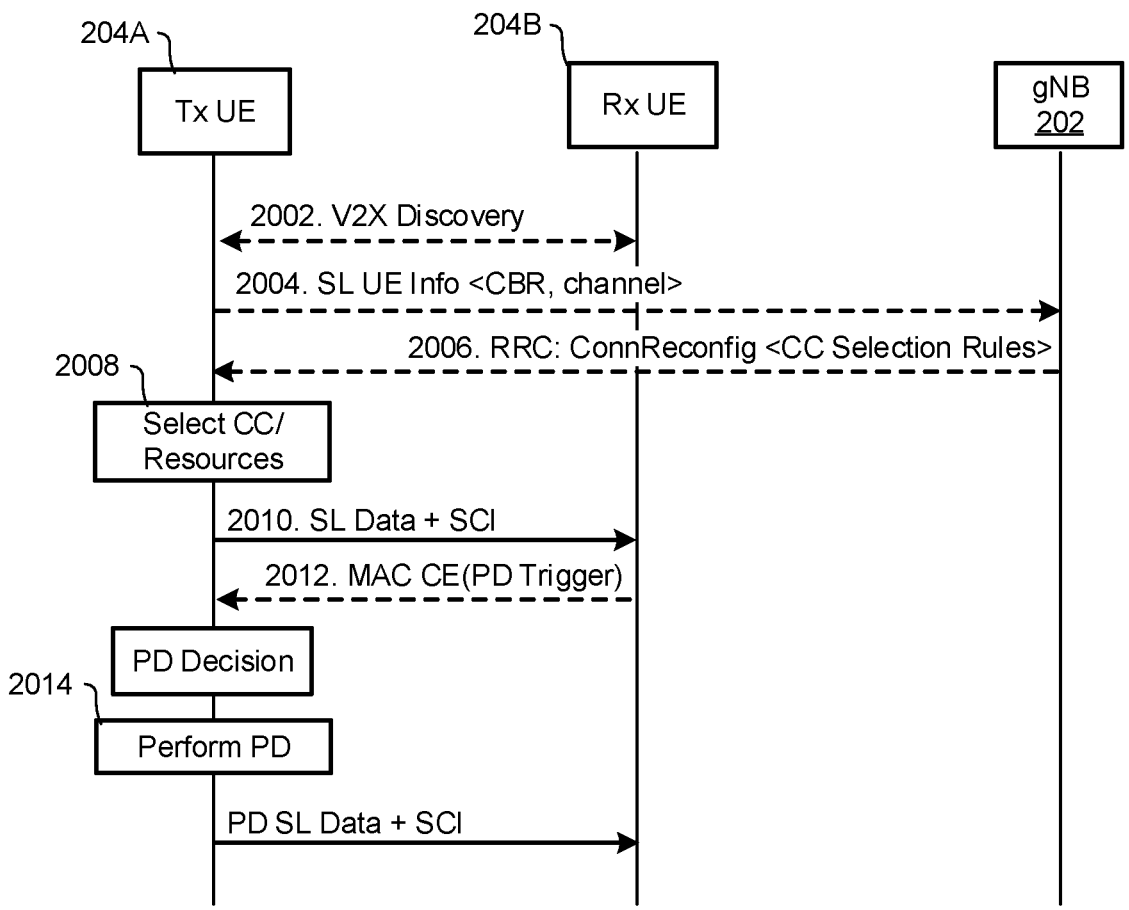
FIG. 20 is a message flow diagram showing a representative process for Mode 4 Dynamic Activation/Deactivation of PD.

The dynamic activation/deactivation of PD in Mode 4 is illustrated in FIG. 19. A representative procedure is illustrated in FIG. 20 and described below:

Step 2002: When the Tx UE and Rx UE are within a certain proximity distance, the V2X services (i.e. Destination ID, PPPP, reliability, CCs) supported by each other are determined via the discovery channel. Tx UE also identifies the CCs used by Rx UE based on pre-configured PPPP-to-CC mapping.

Step 2004: If the Tx UE is in the RRC Connected state, the UE provides the SL UE information (i.e CBR and channel measurements on the configured channels) to the RAN node (gNB).

Step 2006: Based on the CBR and channel measurements, the RAN node (gNB) provides CC selection rules to Tx UE.

Step 2008: If the UE is in RRC Idle state or in full Mode 4 operation, the pre-configured SL-RB mapping (based on PPPP-to-CC) is used by Tx UE to select the CCs. The CBR is measured on the selected CCs.

Step 2010: If the Tx UE has packets for transmission, the Tx UE autonomously selects subchannels/resources from the resource pools in the identified CCs. The Tx UE transmits data on SL.

Step 2012: Since the Rx UE also measures the CBR and channels quality, it can indicate the activation of PD to the Tx UE on SL MAC CE if the conditions for PD are satisfied. Note that in groupcast scenario, all Rx UEs or a subset of Rx UEs in the group may be configured to measure the CBR and channel quality and indicate the activation of PD to the Tx UE on SL MAC CE.

Step 2014: Tx UE enables PD at PDCP and performs transmission of duplicated packets to Rx UE over multiple sidelink CCs to satisfy the reliability requirement Steps 2012 to 2014 may be repeated when there is a need to deactivate PD.

V2X Sidelink Transmission in Handover Scenarios

For ensuring that critical V2X services are supported in all deployment scenarios, it is essential that sidelink transmissions can take place with low latency and high reliability even during handover from the coverage area of one RAN node (gNB) to another. In this case, enabling the UEs to obtain the SL-RB and CC configurations of neighboring cells prior to handover and allowing the UEs to continue using the configurations from the previous cells after handover is beneficial. The use of these make-before-break mechanisms in combination with PD for sidelink transmissions enable to minimize the interruption time to 0ms. Additionally, the dynamic PD activation/deactivation mechanism can be applied in cell edge regions to improve the transmission robustness during handover. In this case, the Tx-UE approaching the cell edge can dynamically activate PD on sidelink in order to transmit to multiple RX UEs in the coverage areas of both the existing and new RAN nodes (gNBs). Likewise, PD can be deactivated after the Tx UE crosses over into the coverage area of the RAN nodes (new gNB). The following describe the procedures to support URLLC based V2X sidelink transmissions in handover scenarios:

Enhanced Mode 3 Handover Scenarios

Figure 21:
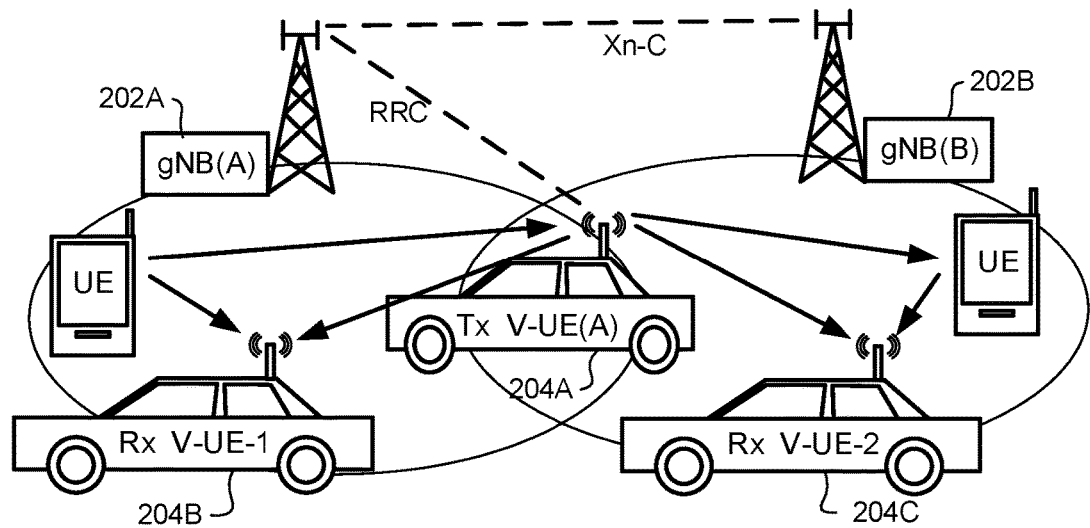
FIG. 21 is a block diagram showing representative relationships between (R)AN elements for Sidelink transmissions during handover in Mode 3.
Figure 22:
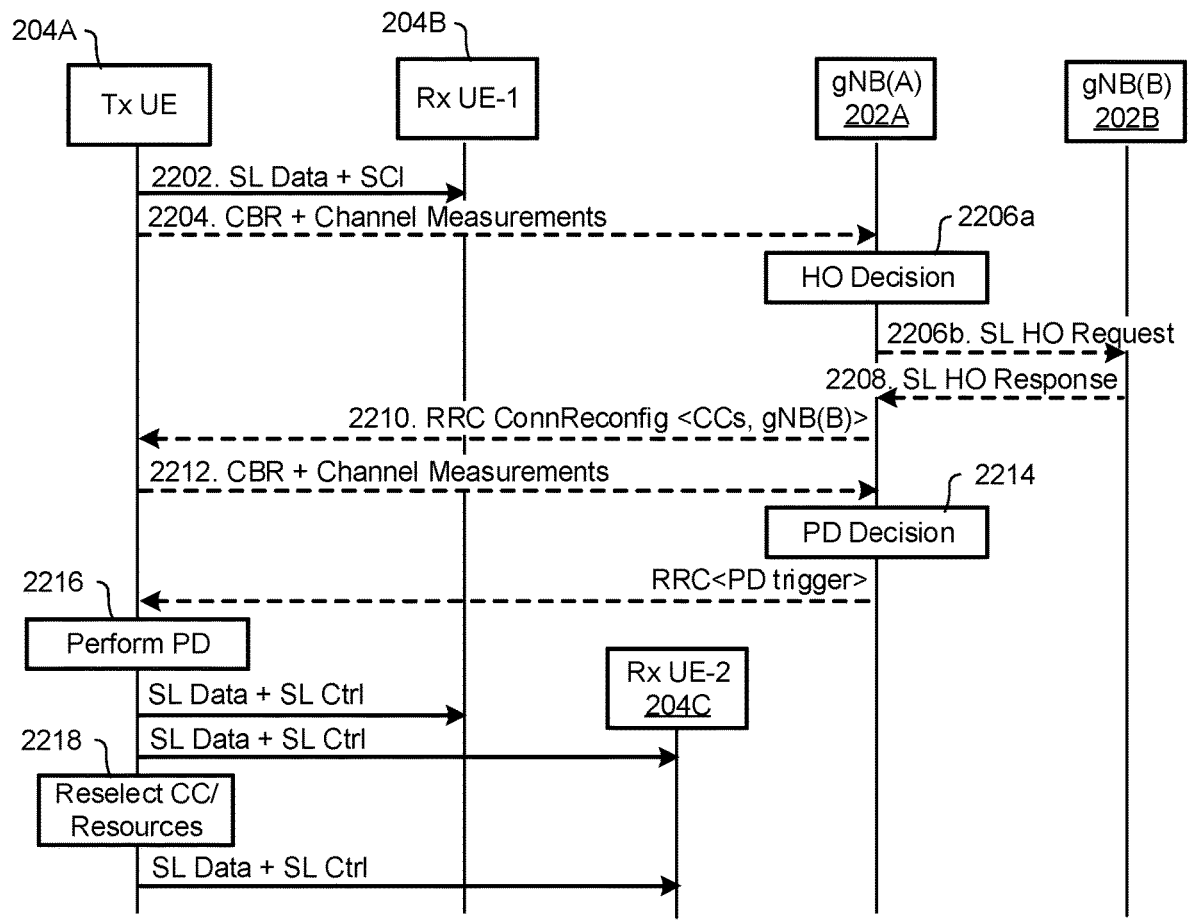
FIG. 22 is a message flow diagram showing a representative process for Sidelink transmissions during handover in Mode 3.

Sidelink transmissions during handover in Mode 3 is illustrated in FIG. 21. A representative procedure is illustrated in FIG. 22 and described below:

Step 2202: In coverage of a source RAN node (gNB(A)), Tx UE performs transmission on the configured SL-RBs and CCs to Rx UE-1.

Step 2204: The Tx UE provides CBR and channel measurements to the first RAN node (gNB(A)) as it approaches the cell edge.

Step 2206: Based on the provided measurements, source RAN node (gNB(A)) makes Hand Over (HO) decision for Tx UE and sends a SL HO request to a target RAN node (g.gNB(B)).

Step 2208: Target RAN node (gNB(B)) provides the CC configuration information that can be used for Tx UE in the SL HO response. Target RAN node (gNB(B)) may provide the RRC context (i.e. UE Temp ID, security keys, RACH preamble, SL-RB profile, Destination IDs) to source RAN node (gNB(A)) in the SL HO response.

Step 2210: Source RAN node (gNB(A)) provides the updated CC configuration applicable in coverage area of target RAN node (gNB(B)) to the Tx UE. Source RAN node (gNB(A)) may also provide the RRC context received from target RAN node (gNB(B)) to Tx UE.

Step 2212: Tx UE continues using existing CCs and provides CBR and channel measurements to source gNB (A).

Step 2214: The source RAN node (gNB(A)) activates PD and provides the PD trigger to the Tx UE to activate PD.

Step 2216: Tx UE enables PD at PDCP and performs transmission of duplicated packets to Rx UE-1 and Rx UE-2 over old and new CCs to satisfy the reliability requirement while still maintaining RRC connection with source RAN node (gNB(A)).

Step 2218: If the condition to release the old CCs (i.e. CBR and channel quality drops below a threshold) is satisfied, the old CCs are released and PD is deactivated. The Tx UE may also establish RRC connection with RAN node (gNB(B) using the previously provided RRC context after releasing the RRC connection with gNB(A).

Enhanced Mode 4 Handover Scenarios

Figure 23:
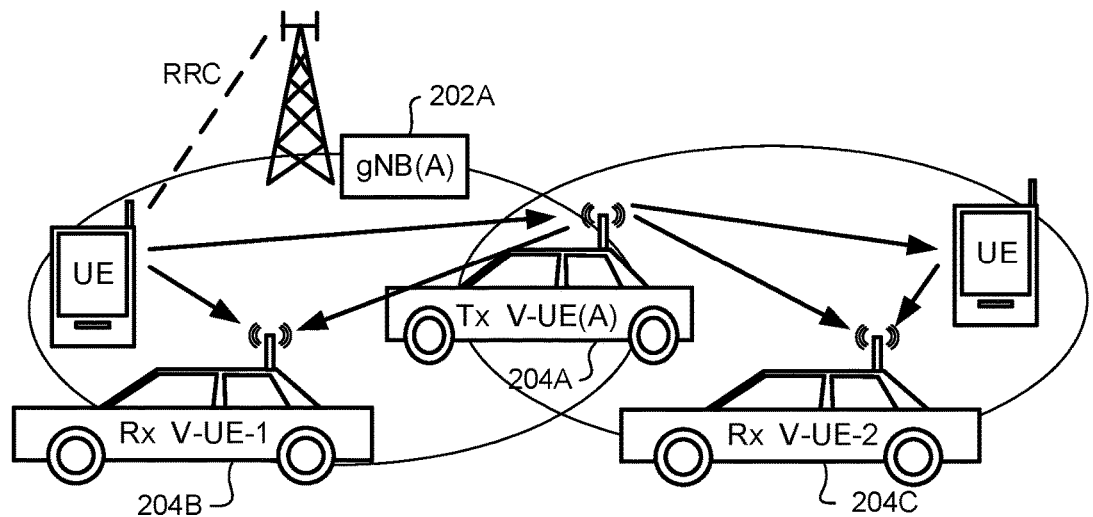
FIG. 23 is a block diagram showing representative relationships between (R)AN elements for Sidelink transmissions during handover in Mode 4.
Figure 24:
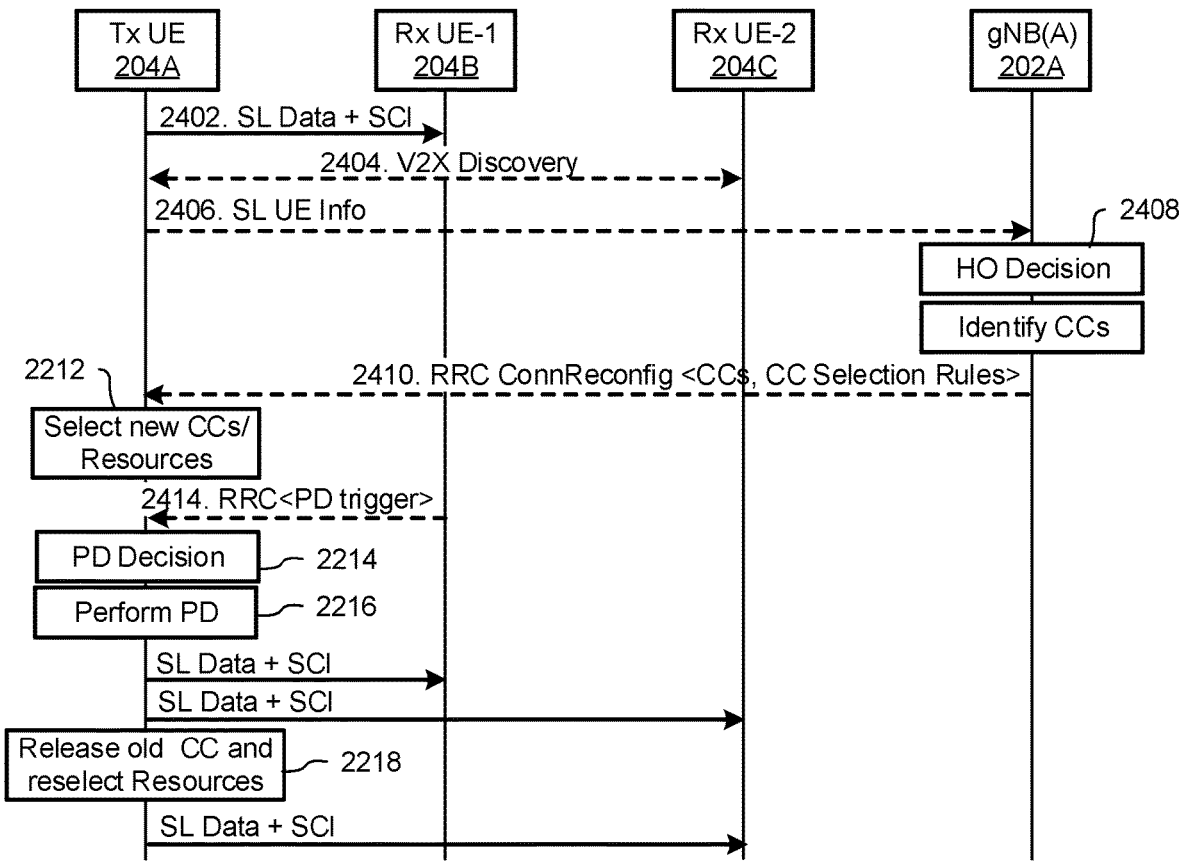
FIG. 24 is a message flow diagram showing a representative process for Sidelink transmissions during handover in Mode 4.

Sidelink transmissions during handover in Mode 4 is illustrated in FIG. 23. A representative procedure is illustrated in FIG. 24 and described below:

Step 2402: In coverage of a first RAN node (gNB(B)), Tx UE performs transmission on the configured SL-RB and CCs to Rx UE-1.

Step 2404: At cell edge, the Tx UE discovers the V2X services and the CCs supported by Rx UE-2.

Step 2406: If the Tx UE is in RRC Connected state, the CBR and channel measurements on the CCs potentially used by Rx UE-2 are provided to gNB(A).

Step 2408: Based on the provided measurements, a second RAN node (gNB(A)) makes an HO decision for Tx UE identifying suitable CCs for SL transmissions to Rx UE-2.

Step 2410: The second RAN node (gNB(A)) provides the rules for selecting the CCs can be used for Tx UE in RRC reconfiguration response.

Step 2412: If the Tx UE is in RRC Idle state or in full Mode 4 operation, the pre-configured SL-RB mapping (based on PPPP-to-CC mapping) is used by Tx UE to select the CCs for transmission to Rx UE-2. The CC selection may be done based on preconfigured geographic zone location-to-CC mapping.

Step 2414: At cell edge, the condition for PD activation is satisfied. The existing Rx UE-1 may provide the PD Trigger in MAC CE to Tx UE.

Step 2416: Tx UE enables PD at PDCP and performs transmission of duplicated packets to Rx UE1 and Rx UE2 over old and new CCs to satisfy reliability requirement. The Tx UE uses the new CCs while continuing to use the old CCs even after crossing over to the neighbouring geographic zone or out of coverage area of gNB(A).

Step 2418: If the condition to release the old CCs (i.e. channel quality drops below a threshold) is satisfied, the old CCs are released and PD is deactivated.

It should be appreciated that embodiments of the present invention provide technical benefits, including having the RAN enable SL communications between UEs by providing configuration information for the SL-RBs.

In some embodiments, an SL-RB can be configured to support a QoS class. In some embodiments, QoS class is for a set of QoS requirements and a QoS class can consist of multiple QoS flows.

An aspect of the disclosure provides method, at a User Equipment (UE), for obtaining configuration information for one or more Sidelink Radio bearers (SL-RBs) used for sidelink communication. The method includes transmitting, to a Radio Access Network (RAN) node, a radio resource control (RRC) sidelink (SL) configuration request, the RRC SL configuration request comprising UE capability information and service information. The method further includes receiving an RRC sidelink configuration response sent by the RAN node, the RRC sidelink configuration response comprising the configuration information. The method further includes storing the configuration information for use in sidelink communication. In some embodiments, the method further includes receiving a message, sent by the RAN node or at least one destination UE, the message comprising one of: an identifier of the at least one destination UE, an identifier of a group of destination UEs, or an identifier of the service supported by the at least one destination UE; configuring the one or more SL-RBs for sidelink communication with the at least one destination UE based on the configuration information; and performing sidelink communication with the at least one destination UE using the configured SL-RBs. In some embodiments, the service information includes at least one of: information indicative that the UE is capable of at least one of: unicast, broadcast, and groupcast transmission; an identifier of one or more services supported by the sidelink communication; identifiers of supported services; identifiers of destination UE; identifiers of destination UE group; QoS indicators requirements; and QoS indicators indicative of one or more supported services by the sidelink communication. In some embodiments, the message sent by RAN is the RRC sidelink configuration response. In some embodiments, the message sent by RAN is a RRC sidelink reconfiguration message. In some embodiments, the configuration information includes connection type information indicative of a connection type supported by the at least one destination UE, the connection type comprising one of unicast, groupcast or broadcast transmission. In some embodiments, the configuration information includes QoS class information indicative a set of QoS requirements supported by the one or more SL-RBs. In some embodiments, one or more QoS flows can be mapped to a QoS class. In some embodiments, the configuration information includes one or more of: identifier of the SL-RB; packet filtering rules; parameters corresponding to the L2 protocol stack associated with the SL-RB; packet duplication configuration information; mapping rules to map between the SL-RBs and SL carriers; SL carrier information; and resource pool information. In some embodiments, the identifier of the SL-RB includes the LCD. In some embodiments, the packet filtering rules are based on connection-type indicators, L2 destination identifiers and QoS identifiers. In some embodiments, the UE capability information includes a set of parameters comprising at least one of: identifier of UE; supported resource scheduling and communication modes; supported radio access technologies (RAT), and RF capability; supported Sidelink carrier frequency bands; UE class information corresponding to maximum transmit power supported; number of Tx/Rx chains supported; and channel sensing, measurement and reporting capability. In some embodiments, the configuration information includes the packet duplication configuration information, the packet duplication configuration information includes: an indication whether packet duplication is to be activated and mapping restrictions when mapping the duplicate packets to different SL carriers.

Another aspect of the disclosure provides a method, by a RAN node, for providing configuration information for one or more Sidelink Radio bearers (SL-RBs) used for sidelink communication with one or more UEs. The method includes receiving, from a UE, radio resource control (RRC) sidelink (SL) configuration request, the RRC SL configuration request comprising UE capability information and service information. The method further includes transmitting an RRC sidelink configuration response to the UE, the RRC sidelink configuration response comprising SL configuration information based on the UE capability information and service information. In some embodiments, the SL configuration information includes one or more of: identifier of the SL-RB; packet filtering rules; parameters corresponding to the L2 protocol stack associated with the SL-RB; configuration information for packet duplication; mapping rules to map between the SL-RBs and SL carriers; SL carrier information; and resource pool information. In some embodiments, the SL configuration information further includes QoS class information indicative a set of QoS requirements supported by the one or more SL-RBs. In some embodiments, the configuration information includes an indication whether packet duplication is to be activated. In some embodiments, the method further includes communicating with a core network function to determine the configuration information. In some embodiments, the service information includes information indicative that the UE is capable of at least one of: unicast, broadcast, and groupcast transmission. In some embodiments, the configuration information includes connection type information indicative of a connection type supported by the at least one destination UE, the connection type comprising one of unicast, groupcast or broadcast transmission.

Another aspect of the disclosure provides a user equipment (UE). The UE includes at least one Radio Access Network (RAN) interface; a processor; and non-transitory machine readable memory storing machine readable instructions. The machine readable instructions are for configuring the UE for: transmitting, to a Radio Access Network (RAN) node, a radio resource control (RRC) sidelink (SL) configuration request, the RRC SL configuration request comprising UE capability information and service information; receiving an RRC sidelink configuration response sent by the RAN node, the RRC sidelink configuration response comprising the configuration information; and storing the configuration information for use in sidelink communication.

Another aspect of the disclosure provides Radio Access Network (RAN) node including at least one radio interface for communicating with UEs; a processor; and non-transitory machine readable memory storing machine readable instructions. The machine readable instructions are for: receiving, from a UE, radio resource control (RRC) sidelink (SL) configuration request, the RRC SL configuration request comprising UE capability information and service information; and transmitting an RRC sidelink configuration response to the UE, the RRC sidelink configuration response comprising SL configuration information based on the UE capability information and service information.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method, at a User Equipment (UE), for obtaining configuration information for one or more Sidelink Radio bearers (SL-RBs) used for sidelink communication, the method comprising:
transmitting a sidelink (SL) configuration request, the SL configuration request comprising UE capability information and service information associated with a requested ultra-reliable low latency (URLL) vehicle-to-anything (V2X) service;
receiving a sidelink configuration response sent the sidelink configuration response comprising the configuration information for one or more SL-RBs associated with the requested URLL V2X service; and
transmitting data associated with the requested URLL V2X service over the one or more SL-RBs using the configuration information.

2. The method of claim 1, wherein the configuration request associated with the requested URLL V2X service comprises at least one of:
an identifier of the requested URLL V2X service;
an identifier of a destination UE to be associated with the requested URLL V2X service;
an identifier of a destination UE group to be associated with the requested URLL V2X service;
quality of service (QoS) indicators to be associated with the requested URLL V2X service
UE capabilities associated with the requested URLL V2X service;
preferred radio resources associated with the requested URLL V2X service.

3. The method of claim 1, wherein the configuration information for the requested URLL V2X service comprises a mapping of the requested URLL V2X service to a set of component carriers.

4. The method of claim 1, wherein the configuration information for the requested URLL V2X service comprises connection type information indicative of a connection type supported by the connection type comprising one of unicast, groupcast or broadcast transmission.

5. The method of claim 1, wherein the configuration information for the requested URLL V2X service comprises quality of service (QoS1 class information indicative of the QoS supported by the one or more SL-RBs.

6. The method of claim 5, wherein one or more QoS flows can be mapped to a QoS class.

7. The method of claim 1, wherein the configuration information for the requested URLL V2X service includes one or more of:
an identifier of the SL-RB;
packet filtering rules for mapping a data packet to an SL-RB;
parameters corresponding to the layer 2 radio link protocol stack associated with the SL-RB;
mapping rules to map between the SL-RBs and SL carriers;
SL carrier information; and
resource pool information.

8. The method of claim 1 wherein the UE capability information includes a set of parameters comprising at least one of:
an identifier of UE;
supported resource scheduling and communication modes;
supported radio access technologies (RAT), and radio frequency capability;
supported Sidelink carrier frequency bands;
UE class information corresponding to maximum transmit power supported;
number of transmitter and receiver chains supported; and
channel sensing, measurement and reporting capability.

9. The method of claim 1 wherein the configuration information for the requested URLL V2X service includes packet duplication configuration information, the packet duplication configuration information comprises:
an indication whether packet duplication is to be activated; and
mapping restrictions when mapping the duplicate packets to different SL carriers.

10. The method of claim 1, wherein the requested URLL V2X service comprises one or more of: platooning, remote driving, and automated driving.

11. A method of claim 1, wherein the sidelink configuration request is an RRC message transmitted to a radio access network (RAN) node and the sidelink configuration response is an RRC message received from a RAN node.

12. The method of claim 1, wherein the sidelink configuration request is transmitted over a SL discovery channel and the sidelink configuration response is received over a SL discovery channel.

13. A method, by a RAN node, for providing configuration information for one or more Sidelink Radio bearers (SL-RBs) used for sidelink communication with one or more UEs, the method comprising of:
receiving, from a UE, a radio resource control (RRC) sidelink (SL) configuration request, the RRC SL configuration request comprising UE capability information and service information associated with a requested ultra-reliable low latency (URLL) vehicle-to-anythinq (V2X) service; and
transmitting an RRC sidelink configuration response to the UE, the RRC sidelink configuration response comprising SL configuration information for one or more SL-RBs associated with the requested URLL V2X service based on the UE capability information and service information.

14. The method of claim 13 wherein the SL configuration for the requested URLL V2X service information comprises one or more of:
an identifier of the SL-RB;
packet filtering rules for mapping a data packet to an SL-RB;
parameters corresponding to the layer 2 radio link protocol stack associated with the SL-RB;
mapping rules to map between the SL-RBs and SL carriers;
SL carrier information; and
resource pool information.

15. The method of claim 14 wherein the SL configuration information further comprises
quality of service (QoS) class information indicative of the QoS supported by the one or more SL-RBs.

16. The method of claim 13 wherein the configuration information for the requested URLL V2X service includes packet duplication configuration information, the packet duplication configuration information comprising an indication whether packet duplication is to be activated and mapping restrictions when mapping the duplicate packets to different SL carriers.

17. The method of claim 13 further comprising communicating with a core network function to obtain the SL configuration information.

18. The method of claim 13, wherein the service information for the requested URLL V2X service includes information indicative of a connection type, the connection type comprising one of: unicast, broadcast, and groupcast transmission.

19. The method of claim 13, wherein the configuration information for the requested URLL V2X service comprises connection type information indicative of a connection type, the connection type comprising one of unicast, groupcast or broadcast transmission.

20. A user equipment (UE) comprising:
a radio link interface;
a processor; and
non-transitory machine readable memory storing machine readable instructions for configuring the UE for:
transmitting, using the radio link interface, a sidelink (SL) configuration request, the SL configuration request comprising UE capability information and service information associated with a requested ultra-reliable low latency (URLL) vehicle-to-anythinq (V2X) service;
receiving, using the radio link interface, a sidelink configuration response, the sidelink configuration response comprising the configuration information for one or more SL radio bearers (SL-RBs) associated with the requested URLL V2X service; and
transmitting, using the radio link interface, data associated with the requested URLL V2X service over the one or more SL-RBs using the configuration information.

* * * * *

UNITED STATES PATENT AND TRADEMARK OFFICE
CERTIFICATE OF CORRECTION

PATENT NO.        : 10,827,380 B2                                    Page 1 of 1
APPLICATION NO.   : 16/258226
DATED             : November 3, 2020
INVENTOR(S)       : Jaya Rao and Sophie Vrzic It is certified that error appears in the above-identified patent and that said Letters Patent is hereby corrected as shown below:

In the Claims

Column 27, Line 46, Claim 5:
"quality of service (QoS1 class information indicative of the"
Should read:
--quality of service (QoS) class information indicative of the--

Column 28, Line 38, Claim 13:
"to-anythinq (V2X) service; and"
Should read:
--to-anything (V2X) service; and--

Column 29, Line 23, Claim 20:
"low latency (URLL) vehicle-to-anythinq (V2X) ser-"
Should read:
--"low latency (URLL) vehicle-to-anything (V2X) ser- --

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*